US005274755A

United States Patent [19]

Priem et al.

[11] Patent Number: 5,274,755

[45] Date of Patent: Dec. 28, 1993

[54] HARDWARE IMPLEMENTATION FOR PROVIDING RASTER OFFSETS IN A GRAPHICS SUBSYSTEM WITH WINDOWING

[75] Inventors: Curtis Priem, Freemont; Chris Malachowsky, Santa Clara, both of Calif.

[73] Assignee: Sun Microsystems, Inc., Mountain View, Calif.

[21] Appl. No.: 308,093

[22] Filed: Feb. 8, 1989

[51] Int. Cl.[5] .......... G06F 15/20

[52] U.S. Cl. .......... 395/157

[58] Field of Search .......... 364/518, 521, 522, 523; 340/747-; 382/44-; 395/157

[56] References Cited

U.S. PATENT DOCUMENTS

| | | | |
|---|---|---|---|
| 4,570,236 | 2/1986 | Rebel et al. | 382/44 X |
| 4,652,760 | 3/1987 | Kondo et al. | 382/44 X |
| 4,689,824 | 8/1987 | Mitchell et al. | 382/46 |
| 4,774,678 | 9/1988 | David et al. | 382/45 X |
| 4,837,844 | 6/1989 | Urushibata | 382/44 |

FOREIGN PATENT DOCUMENTS

| | | |
|---|---|---|
| 2144952A | 7/1984 | United Kingdom . |
| 2147772A | 9/1984 | United Kingdom . |
| 2202115A | 2/1988 | United Kingdom . |
| 2215956A | 3/1988 | United Kingdom . |

*Primary Examiner*—H. A. Herndon

*Attorney, Agent, or Firm*—Blakely Sokoloff Taylor & Zafman

[57] ABSTRACT

An apparatus for implementing, in hardware, circuitry for adding a raster offset to screen coordinates in a graphics display subsystem for the purpose of displaying the image in a window which may be moved by a user to an arbitrary position on a screen display. Specifically, a pair of raster offsets, one for X coordinates and one for Y coordinates, are stored in X and Y raster offset registers. The X and Y raster offsets correspond to the offset of an active window from the origin of the screen display. These offsets are added to each coordinate which is to be displayed within the active window in a manner which does not result in any additional overhead.

4 Claims, 17 Drawing Sheets

X/Y COORDINATE REGISTERS LOAD AND COMPARISON TIMINGS (Indexed Loading. Index =0)

| CLOCK CYCLE | n | n+1 | n+2 | n+3 | n=4 | n+5 |
|---|---|---|---|---|---|---|
| DATAIN | QUAD Y | | QUAD X | | Y1 | |
| LOAD LOGIC | | Y0L=YRASOFF | Y0H=YRASOFF | X0L=XRASOFF | X0H=XRASOFF | Y1L=YRASOFF |
| COMPARISON LOGIC | | | Y0L:Y1L<br>Y0L:Y2L<br>Y0L:Y3L | Y0L:YCLIPMIN<br>Y0L:YTESTMIN<br>Y0L:YCLIPMAX | X0L:X1L<br>X0L:X2L | X0L:XCLIPMIN<br>X0L:XTESTMIN<br>X0L:XTESTMAX |

*Figure 9a*

CLIPPING COORDINATE REGISTERS LOAD AND COMPARISON TIMINGS

| CLOCK CYCLE | n | n+1 | n+2 | n+3 | n=4 | n+5 |
|---|---|---|---|---|---|---|
| DATAIN | YCLIPMIN | | XCLIPMIN | | YCLIPMAX | |
| LOAD LOGIC | | YCLIPMIN | | XCLIPMIN | | YCLIPMAX |
| COMPARISON LOGIC | | | YCLIPMIN:Y0L<br>YCLIPMIN:Y1L<br>YCLIPMIN:Y2L<br>YCLIPMIN:Y3L | YTESTMIN:Y0L<br>YTESTMIN:Y1L<br>YTESTMIN:Y2L<br>YTESTMIN:Y3L | XCLIPMIN:X0L<br>XCLIPMIN:X1L<br>XCLIPMIN:X2L<br>XCLIPMIN:X3L | XTESTMIN:X0L<br>XTESTMIN:X1L<br>XTESTMIN:X2L<br>XTESTMIN:X3L |

*Figure 9b*

HARDWARE IMPLEMENTATION FOR PROVIDING RASTER OFFSETS IN A GRAPHICS SUBSYSTEM WITH WINDOWING

SUMMARY OF THE INVENTION

The present invention is directed to an apparatus for implementing, in hardware, circuitry for adding a raster offset to screen coordinates in a graphics display subsystem for the purpose of displaying the image in a window which may be moved by a user to an arbitrary position on a screen display. Specifically, a pair of raster offsets, one for X coordinates and one for Y coordinates, are stored in X and Y raster offset registers. The X and Y raster offsets correspond to the offset of an active window from the origin of the screen display. These offsets are added to each coordinate which is to be displayed within the active window in a manner which does not result in any additional overhead. In the prior art, in order to display an image in a window which may be moved arbitrarily on a screen display, the necessary transformations are usually performed in software. The present invention eliminates the need to perform such transformations in software.

For example, if it is desired to turn on a pixel at position (0,0), in a graphics subsystem having windowing capabilities, that pixel will actually be located at coordinate (0, 0) of the window rather than position (0, 0) of the screen display. By loading the X raster offset register with the X offset of the window from the screen position at which X equals 0, and loading the Y raster offset register with the Y offset of the window from the screen position at which Y equals 0, then if the contents of the X and Y raster offset registers are added to the X and Y coordinates of an image to be displayed, the image will be correctly displayed in the window without the software having to perform any further calculations.

BRIEF DESCRIPTION OF THE DRAWINGS

FIGS. 9*a* and 9*b* are tables showing relative timings for loading control state machine 35 and comparisons performed by comparison logic and result storage 47.

DETAILED DESCRIPTION OF THE INVENTION

Figure 1:
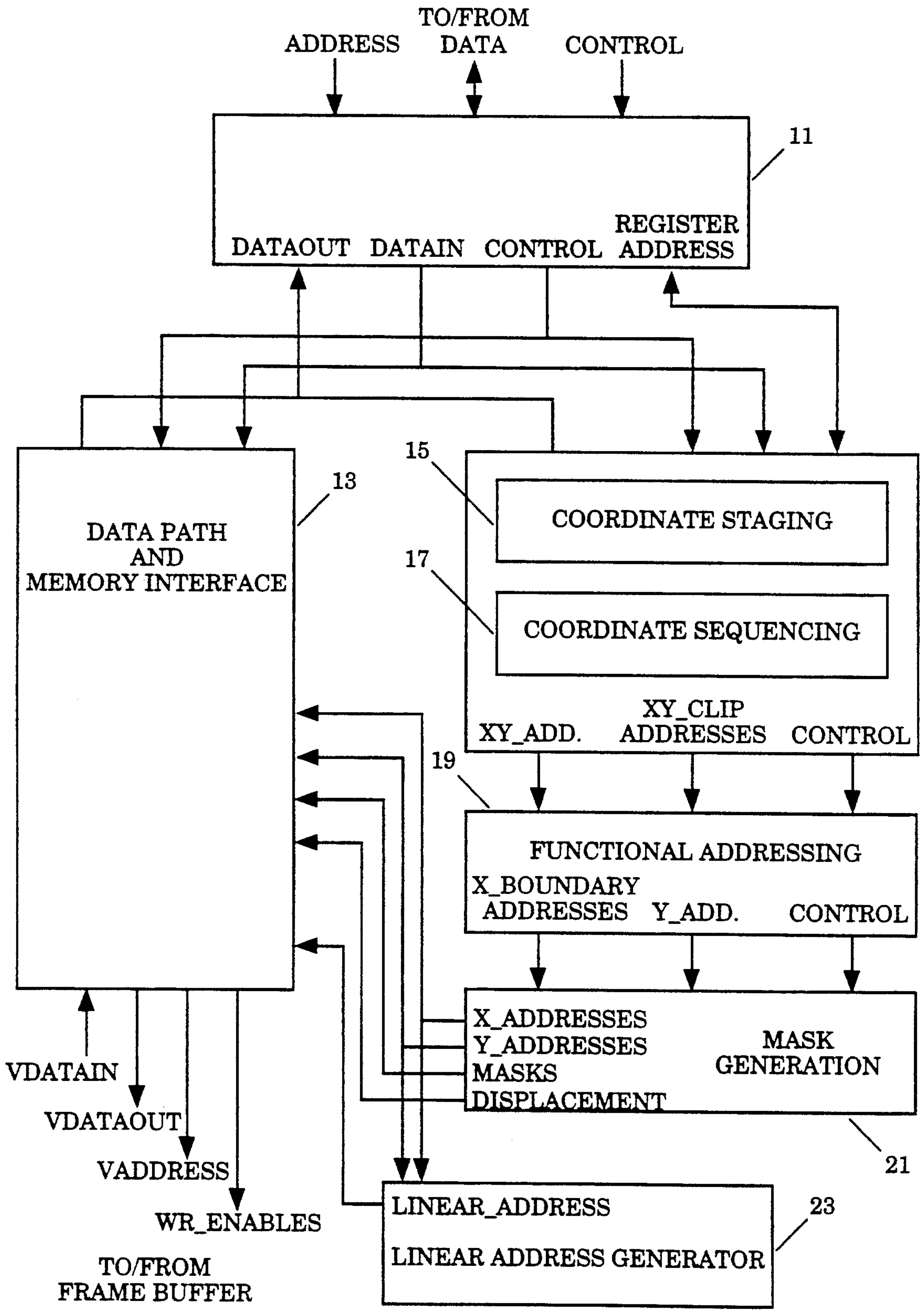
FIG. 1 is a block overview diagram of a graphics subsystem for a work station according to the present invention.

The present invention is directed to a graphics subsystem of an engineering workstation, and specifically a hardware implementation for converting the coordinates of images to be displayed by the graphics subsystem from a set of coordinates relative to the origin coordinates of a display to a set of coordinates relative to the coordinates of a window which may be moved to an arbitrary position on the screen. Specifically, an X and a Y raster offset register are loaded with X and Y offsets for an active window and the values contained therein are added to incoming screen coordinates. The details may be found in the description of loading control state machine 33 and index logic 43 below, as is the manner in which the raster offset registers are loaded with the window offsets.

In this manner, the software need not concern itself with applying the necessary transformations to display an image in a window which may be arbitrary moved to any position on a screen display.

In the present invention, coordinate staging and coordinate comparison logic blocks (see FIG. 1) are provided to provide the necessary storage and comparison information required for the support of arbitrary quadrilateral rendering with clipping, as well as Block Image Transfers (BLIT) with clipping. In both cases, it is necessary to specify four X/Y coordinate pairs and to specify the clipping window boundaries.

To support quadrilateral rendering implies the availability of four vertices which will define the quadrilateral. The disclosed embodiment of the invention puts very few restrictions on these vertices. They are stored in four register pairs (a register pair consists of one register for the X coordinate and one register for the Y coordinate) and are referenced with the vertex numbers 0 thru 3. It is implied that vertex 0 is connected to vertex 1, vertex 1 to vertex 2, vertex 2 to vertex 3, and vertex 3 to vertex 0. No connection is intended between vertices 0 and 2, or vertices 1 and 3 for instance. The coordinate staging and comparison logic form the initial stages of a pipeline that will eventually accomplish the rendering of the specified quadrilateral into the display memory. The subsequent pipeline stages require information concerning the relationship of each adjacent vertex to its neighbors (i.e. for vertex 1; X1 vs X0, Y1 vs Y0, X1 vs X2, and Y1 vs Y2). This information is needed to properly supply the functional addressing block with a series of trapezoids that when composited, accurately represent the original quadrilateral. The decomposition of the arbitrary quadrilateral is accomplished by the coordinate sequencing logic.

Additionally, in order to support the clipping of the quadrilateral to the clipping boundaries in subsequent pipeline stages, the relationship of the vertices to the appropriate clipping boundaries is required. This means for example all X vertices compared to both the minimum X clip boundary as well as to the maximum X clip boundary. A similar set of comparisons is required for the Y vertices as well. In some cases, these comparisons can indicate whether or not an object has any visible portions (non-clipped) at all. By identifying the objects that will not be visible in advance, the utilization of the subsequent pipeline stages can be avoided since no visible pixels will ever be identified for writing to the display memory. This represents a performance advantage in that the rendering of the quadrilateral can be considered to have occurred immediately once the clipping information has been analyzed.

The preferred embodiment of the graphics system being described utilizes 16-bit 2's complement math when determining the pixel's associated with a line segment. This math involves taking the difference of the two X and two Y vertices of the line segment. In order to avoid mathematical overflow, the numeric range of the X and Y vertex values must be restricted to be representable in 15 bits or be between $-2^{14}$ and $(2^{14}-1)$. In support of this, a check of the numeric range of the vertices is made by the coordinate comparison logic.

The support of BLITs also requires 4 vertices—two specify the opposite corners of a source (SRC) rectangle and two specifying the opposite corners of a destination (DEST) rectangle. The intent of the BLIT operation is to copy the pixels contained in the SRC rectangle to the DEST rectangle. In the current embodiment, the upper left corner of the SRC rectangle is stored in vertex 0 while the lower right SRC corner is in vertex 1. Similarly, the upper left DEST comer is in vertex 2 and the lower right in vertex 3. In order to properly copy the SRC to the DEST, care must be taken in the event the two rectangles overlap. When this occurs, the order in which pixels are copied is constrained if the correct result is to be obtained. This is a well known problem to persons skilled in the art. The information required to properly determine the pixel copying constraints involve comparison of the SRC rectangle boundaries to the DEST rectangle boundaries. This is needed both for the X and the Y coordinates involved.

Additionally, to support clipping of both the SRC and DEST rectangles in subsequent pipeline stages, the relationship of the SRC and DEST vertices to the appropriate clipping boundaries is required. Once again, this may indicate that either the SRC or DEST rectangle are totally obscured (non-visible) and may negate the need to utilize the subsequent pipeline stages. This represents a performance advantage in that the execution of the BLIT can be considered to have occurred immediately once the clipping information has been analyzed.

The coordinate staging control logic supports multiple ways for the coordinate values to be acquired. Correspondingly, the coordinate comparison logic maintains the necessary comparison information regardless of the manner in which the coordinate values are provided. The different methods for coordinate acquisition can be summarized as: absolute, indexed, and relative. The specific method used is determined by the address of the register that the CPU uses to identify the register(s) to be loaded. An absolute coordinate value is loaded by storing the actual value supplied by the CPU into the addressed register. This method of loading is used for loading of the clipping boundary registers and the raster offset registers as will be described below, as well as individual coordinate registers. The second method, indexed, is used to efficiently load multiple coordinates with the same values. In this case, the CPU supplied value is first added to the appropriate raster offset register (either raster offset X or Y) before being made available for storage in one or more coordinate registers. The addition of the raster offset provides a means of offsetting the X/Y address space provided by the CPU to a different area of the display memory.

The indexed loading mechanism utilizes a two-bit index to guide itself and identify how many and which coordinate registers to load during any given cycle. It is this mechanism that allows the CPU to specify only one X/Y pair to identify the degenerate quadrilateral—a point, or two X/Y pairs for a line, or three X/Y pairs for a triangle. When one of the aforementioned degenerate quadrilaterals is loaded into the four vertex registers, one or more vertices may be repeated. This is necessary so that subsequent stages of the pipeline can always interpret the object defined as a quadrilateral (even though degenerate) and not treat as a special case all lower order objects (i.e., point, line, triangle). The indexed loading scheme also allows for only the opposite comers of a rectangle to be entered to properly define all four comers of the corresponding quadrilateral.

The last loading method, relative, is used to allow the CPU to just specify the difference between the last coordinate entered and the intended new coordinate value. In this case a CPU supplied delta or offset is added to the previously loaded coordinate before being loading into one or more registers. The 2-bit index is used to identify the last coordinate entered [vertex (index$-$1) mod 4] for the necessary addition plus identifies which register or registers need to be loaded as in the indexed loading case.

In the end result, the CPU is free to choose to load the coordinate registers in any manner supported. When the operation, either a quadrilateral rendering or BLIT, is actually requested (after the coordinates have already been loaded) the current state of the four vertices are utilized directly without regard to how they were acquired. This provides the utmost in flexibility for the CPU.

FIG. 1 is an overview of a graphics subsystem in which the present invention may be utilized. Bus interface logic 11 is connected through address, data and control buses to a central processing unit (not shown). The functional components of the graphics subsystem are data path and memory interface 13, coordinate staging section 15, coordinate sequencing section 17, functional addressing block 19, mask generation block 21 and linear address generator 23.

Data path and memory interface 13 update a frame buffer (not shown) which is a memory which stores graphical information to be displayed on a video display such as a CRT. That is, data which is loaded into the frame buffer is accessed by video circuitry which converts the data to appropriate electrical signals which, in turn, turn individual pixels of the video display on and off. The data from bus interface logic is modified by mask generation block 21 and linear address generator 23 based upon processing performed by coordinate staging section 15, coordinate sequencing section 17 and functional addressing stage 19. Functional addressing stage 19 also accomplishes a portion of the clipping necessary to fit particular graphic objects to the clip window in which they are to be displayed, and then transfers the signals to mask generation stage 21 which arranges the information into sixteen pixel portions that traverse from the beginning to the end of the visible object for each scan line and are used for addressing the data path and memory interface stage 13.

The mask generation signals are also furnished to linear address generator 23 which translates the addresses provided by the mask generation stage 21 into signals for linearly addressing the frame buffer for transfer to the output display. One embodiment of data path and memory interface block 13 may be found in co-pending application Ser. Nos. 257,853, 257,985 and 258,133 all filed Oct. 14, 1988. An embodiment of coordinate sequencing logic 17 is disclosed in co-pending application Ser. No. 287,128 filed Dec. 20, 1988. An embodiment of functional addressing block 19 is disclosed in co-pending Ser. Nos. 286,997 and 287,392 both filed Dec. 20, 1988. An embodiment of linear address generator 23 is disclosed in co-pending application Ser. No. 287,493 filed Dec. 20, 1988. The present invention is directed to circuitry in coordinate staging block 15 which performs certain operations based upon its inputs, the specifics of which will be described below with reference to FIGS. 2-14 generating information in the nature of control signals to enable a graphics subsystem to perform arbitrary quadrilateral rendering with clipping and block image transfers (BLITS) with clipping. Thus, the present invention is directed to specific circuitry within coordinate staging section 15.

Implementation of the various timing and control signals needed for the proper operation of the foregoing functional blocks comprising a video display subsystem are well known to persons skilled in the art and, therefore, will not be described herein except as necessary for a proper understanding of the invention.

Figure 2:
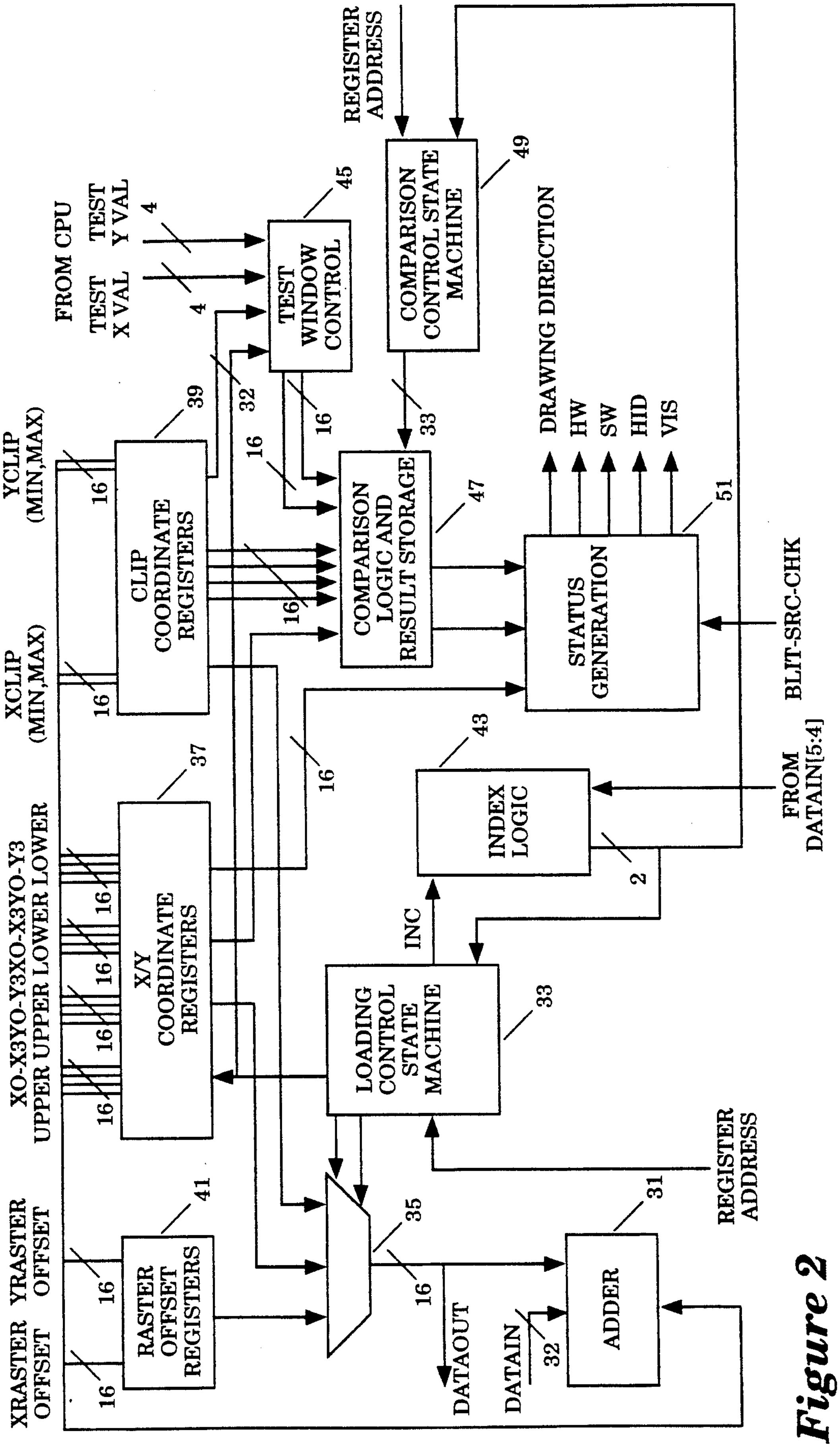
FIG. 2 is a block diagram of the coordinate staging section of the invented graphics subsystem.

Referring now to FIG. 2, a block overview diagram of coordinate staging section 15 is shown. Coordinate staging section 15 comprises adder 31, loading control state machine 33, multiplexer 35, XY coordinate registers 37, clip coordinate registers 39, raster offset registers 41, index logic 43, test window control logic 45, comparison logic and result storage 47, comparison control state machine 49, and status generation logic 51.

Before setting forth the specifics of the present invention, a brief description of the manner in which objects are represented follows to aid the understanding of the manner in which the present invention is implemented.

XY pairs of vertices represent video display coordinates. For a typical display, X ranges between 0-1151 and Y ranges between 0-899. Each X coordinate and each Y coordinate is stored in a separate 32 bit register or a pair of 16 bit registers. Although 16 bits are more than adequate to store the largest screen coordinate (i.e., up to 65535 or −32768 to +32767), 32 bits of information are stored because it is the data type most prevalent in graphics software and provides a large enough range to handle most real life objects which may span areas much larger than the video display.

Quadrilateral objects are represented as combinations of four pairs of vertices $(X_0,Y_0)$, $(X_1,Y_1)$, $(X_2,Y_2)$, and $(X_3,Y_3)$. If an object is a point, then all four pairs of vertices are the same or three points repeated. If an object is a line, then two of the four (or three of the four) pairs of vertices are replicated. If an object is a triangle, then one pair of vertices out of the four pairs is replicated. If an object is a quadrilateral then all four pairs are distinct. Objects (i.e., point, line, triangle or quadrilateral) are most efficiently defined using the minimum number of unique vertices necessary to completely define the object, i.e., for a point—1, for a line—2, for a triangle—3, for a quadrilateral—4 and for a rectangle—2 (opposite corners).

If a block image transfer (BLIT) operation is to be performed, then the four X/Y registers have the following interpretation and are loaded accordingly:

- X0 - X coordinate for upper left comer of the source block.
- Y0 - Y coordinate for upper left comer of the source block.
- X1 - X coordinate for lower right comer of the source block.
- Y1 - Y coordinate for lower right comer of the source block.
- X2 - X coordinate for upper left comer of the destination block.
- Y2 - Y coordinate for upper left comer of the destination block.
- X3 - X coordinate for lower right comer of the destination block.
- Y3 - Y coordinate for lower right comer of the destination block.

Images to be displayed on a display such as a CRT are formed as discrete pixels which are stored in a random access memory (RAM) known as a frame buffer in one or more planes (or bits), the number of planes typically being eight for a color system. Data stored in the frame buffer is addressed by a pair of coordinates, X and Y, where an X,Y pair identifies a particular pixel in all planes, X being the row and Y being the column. A pixel is defined by a single bit from each plane. Thus, if eight planes are utilized, each displayed pixel is defined by eight bits in the frame buffer. In this manner, one bit of a pixel can be used to specify whether it is on or off, with the remaining seven bits specifying the color of the pixel, or all eight pixels can be used to specify the color, with one of the colors being the same as the background color of the display to turn the pixel off.

The present invention lies mainly in its implementation of index logic 43, adder 31, raster offset registers 41 and loading control state machine 33 which orchestrates the acquisition of the raster offsets and screen coordinates and the addition of the two to obtain the desired display coordinates. In this connection, with respect to the other functional blocks shown in FIG. 2, their operation and implementation will be described only in such detail as is necessary for a proper understanding of the present invention.

ADDER 31 AND MUX 35

Adder 31 is a 16 or 32-bit 2's complement binary adder having two inputs, namely DataIn from bus interface logic 11 which represents incoming data from the CPU and an input from MUX 35 which is a multiplexer which selects one of a set of inputs from raster offset registers 47, X/Y coordinate registers 37, or clip coordinate registers 39. The input from MUX 35 is selected by signals generated by loading control state machine 33 as described below.

Figure 3:
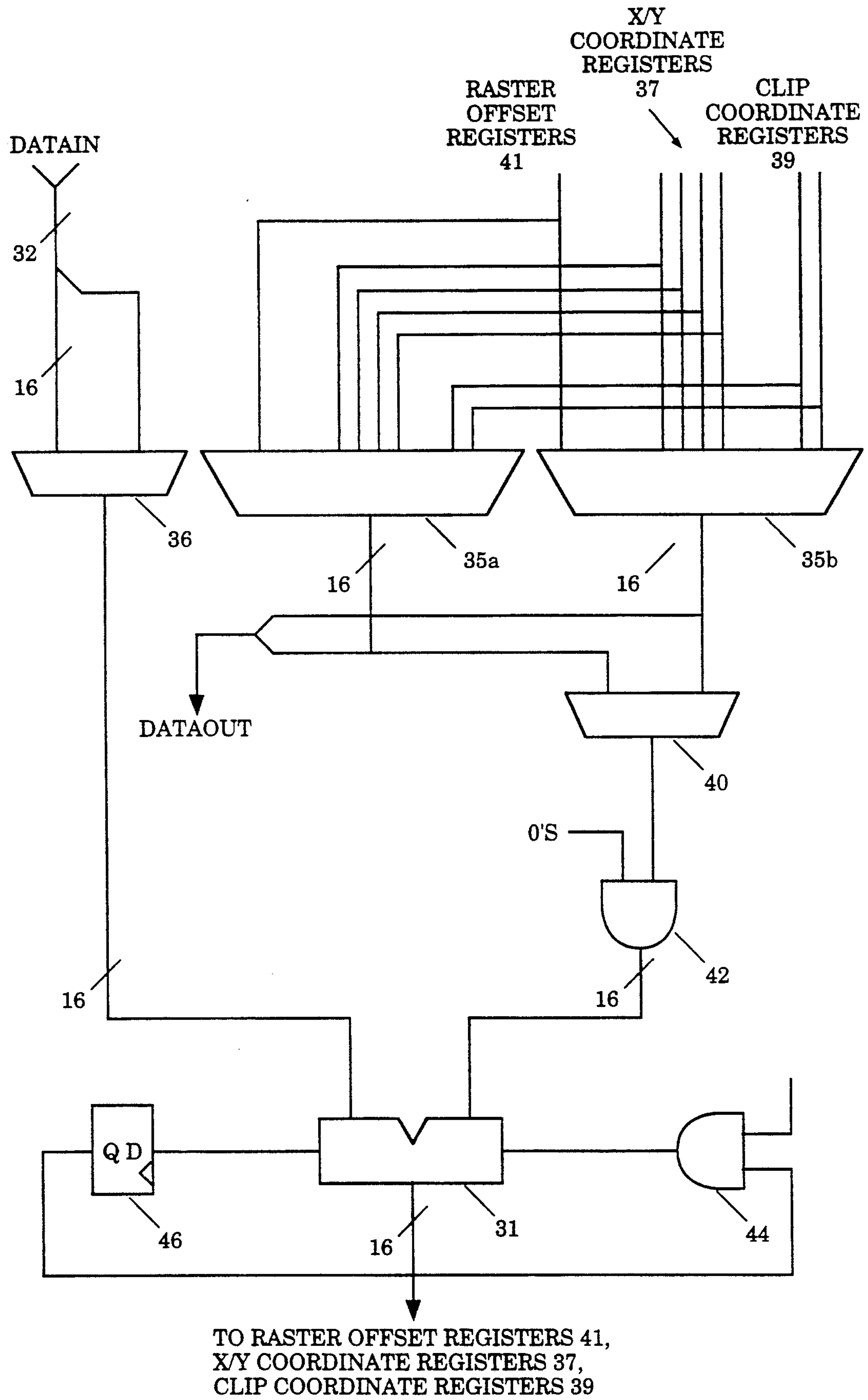
FIG. 3 is a detailed block diagram of adder 31 and multiplexor 35.

The details of adder 31 and multiplexor 35 will now be described with reference to FIG. 3. In FIG. 3, adder 31 is shown as a 16 bit adder. In this connection, although a 32 bit adder could be used since DataIn in the preferred embodiment is 32 bits, in order to save space on the integrated circuit in which the invention is implemented and since timing requirements of the pipeline utilized by the present invention are satisfied by a two step add, the following description will be directed to a 16 bit adder. The differences for utilizing a 32 bit adder will be apparent to those skilled in the art and, therefore, will not be described.

Multiplexor 35 is actually a pair of multiplexors 35*a* and 35*b* and a third multiplexor 36 which is used to input the high order and low order 16 bits from DataIn. Multiplexor 35*a* and 35*b* receive the high order and low order 16 bits respectively from seven 32 bit inputs as follows: one 16 bit input (sign extended to 32-bits) from raster offset registers 41, four 32 bit inputs from X/Y coordinate registers 37 and two 16 bit inputs (sign extended to 32-bits) from clip coordinate registers 39. The outputs from multiplexors 35*a* and 35*b* are combined to form the signal DataOut (for providing read access to these register values to the CPU) and are also input to a third multiplexor 40 which passes the output from multiplexor 35*a* whenever the high order bits from $X_0$–$X_3$ or $Y_0$–$Y_3$ are being accessed; otherwise multiplexor 40 selects the output from multiplexor 35*b*. The output from multiplexor 40 is one input to logic gate 42 which either passes the 16 bit output from multiplexor 40 or passes 16 bits of zeros. In this connection, zeros are forced by logic gate 42 whenever the bits of DataIn are passed by multiplexor 36 for directly loading (absolute loading) into a register within raster offset registers 47, X/Y coordinate registers 37, or clip coordinate registers 39. Also shown in FIG. 3 are logic circuits 44 and 46 which perform the following function. When a low order 16-bit add is taking place, AND gate 44 has its output forced to a low providing a carry-In of a "0" to the adder 31. The carry out of this add is saved in flip flop 46. The output of flip flop 46 is gated by AND gate 44 to the carry in of adder 31 during the addition of the upper 16-bits. This combination provides a 2 cycle 32-bit add equivalent to a single cycle 32 bit add.

The operation of adder 31, raster offset registers 41, X/Y coordinate registers 37, clip coordinate registers 39, test window control 45 and comparison logic and result storage 47 are coordinated by loading control state machine 33 and comparison logic state machine 49 which causes the aforesaid functional blocks to operate so that the data is flowing in a pipeline. Thus, although not all control lines from loading control state machine 33 and comparison logic state machine 49 are shown, the details will be readily apparent to those skilled in the art from the description of loading control state machine 33 and comparison logic state machine 49 below.

X/Y COORDINATE REGISTERS 37

Figure 4:
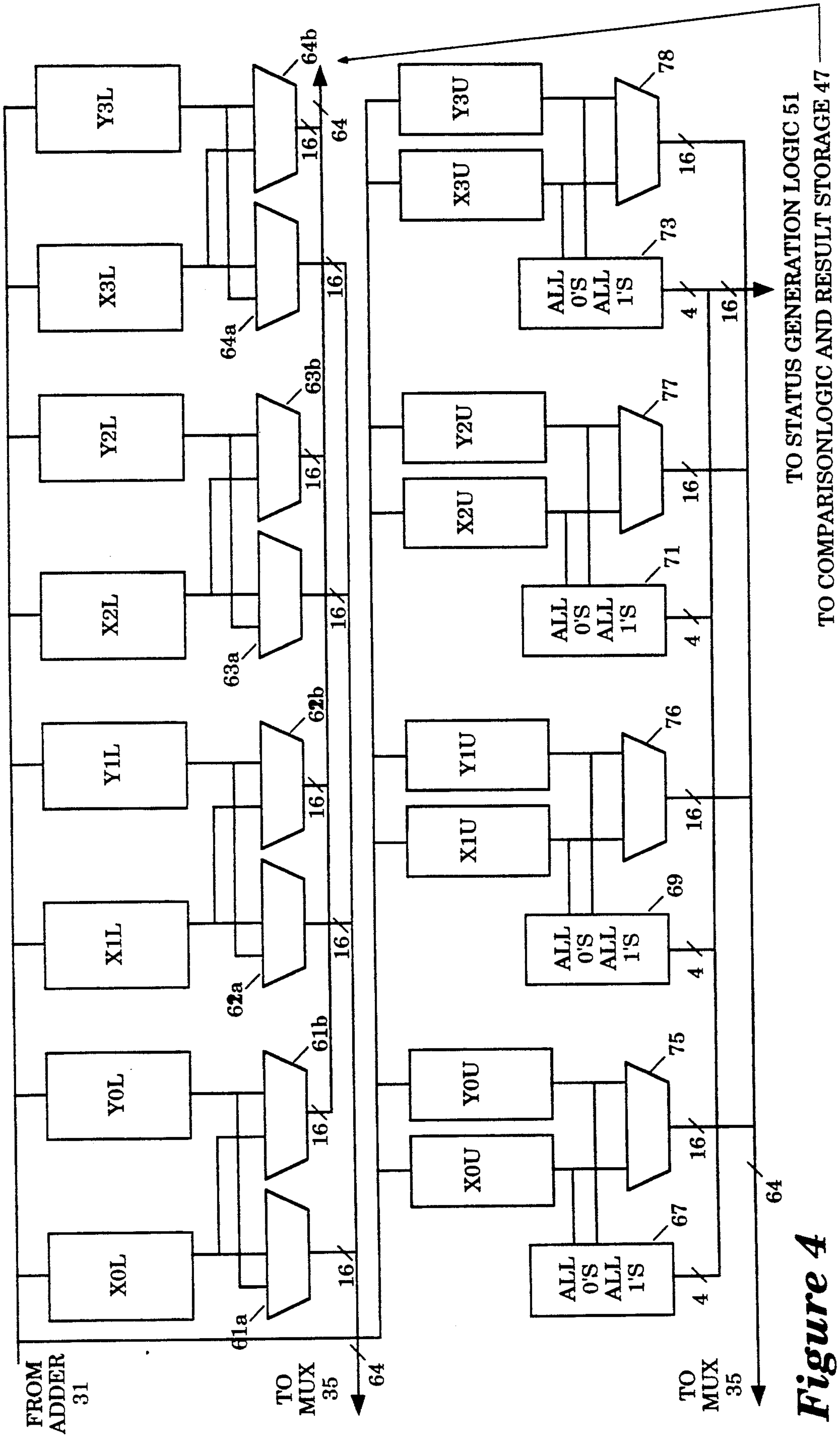
FIG. 4 is a detailed block diagram of X/Y coordinate registers 37.

X/Y coordinate registers 37 is, referring to FIG. 4, a set of 16-bit registers which store the $(X_0,Y_0)$-$(X_3,Y_3)$ vertices, of an object to be drawn. One 16-bit register is used to store the upper 16 bits of each X coordinate and another 16-bit register is used to the store the lower 16 bits of each X coordinate. Similarly, another 16-bit register holds the upper 16 bits of each Y coordinate and another 16-bit register holds the lower 16 bits of each Y coordinate. These registers are shown in FIG. 4 as X0L representing the lower 16 bits of the $X_0$ coordinate and X0U representing upper 16 bits of the $X_0$ coordinate. Registers X1L–X3L and X1U–X3U represent the lower and upper 16 bits of the $X_1$–$X_3$ coordinates respectfully. Similarly registers Y0L–Y3L and Y0U–Y3U store the lower and upper 16 bits of the $Y_0$–$Y_3$ coordinates of the object. References to X0,Y0 etc. mean the 32 bit value stored in the corresponding register pair, i.e., X0U,X0L and Y0U,Y0L.

Each pair of registers, (X0L,Y0L)-(X3L,Y3L) are coupled to a multiplexer pair which are used to select either the corresponding X or Y register. For example, registers X0L and Y0L are coupled to multiplexers 61*a* and 61*b*. Loading control state machine 33 generates a signal which directs multiplexer 61*a* to select the input from register X0L or Y0L depending upon the whether the X coordinates are to be operated upon or the Y coordinates are to be operated upon. Each of multiplexers 62*a* and 62*b*–64*a* and 64*b* operate in the same manner respectively for data from register pairs (X1L,Y1L)-(X3L,Y3L). The outputs from multiplexers 61*a*–64*a* go to multiplexer 35*b*, while the outputs from multiplexers 61*b*–64*b* go to comparison logic and result storage 47.

Blocks 67, 69, 71, and 73 labeled All 0's All 1's are each logic circuitry which checks the upper 18-bits of its corresponding X,Y coordinate pair for all zeros or all ones. Sixteen of the bits come from the registers (X0U,Y0U)-(X3U,Y3U) with the seventeenth and eighteenth bits coming from the high order two bits of the corresponding register in the grouping (X0L,Y0L-X3L,Y3L). The seventeenth and eighteenth bit input is not shown in FIG. 4 to avoid unnecessarily cluttering the figure. The register pairs (X0U,Y0U)-(X3U,Y3U) are input into multiplexers 75–78 respectively which select either the X coordinate or Y coordinate in the same manner as multiplexer pairs 61*a*,61*b*–64*a*,64*b*. The outputs from multiplexers 75–78 go to multiplexer 35*a*. One of the 4-bits output from each of logic blocks 67–73 are each a "1" if the upper 18-bits of its corresponding register are all zeros or all ones, otherwise each of the 4-bits is zero. The four 4-bit outputs from blocks 67–73 are input into status generation logic 51.

CLIP COORDINATE REGISTERS 39

Figure 5:
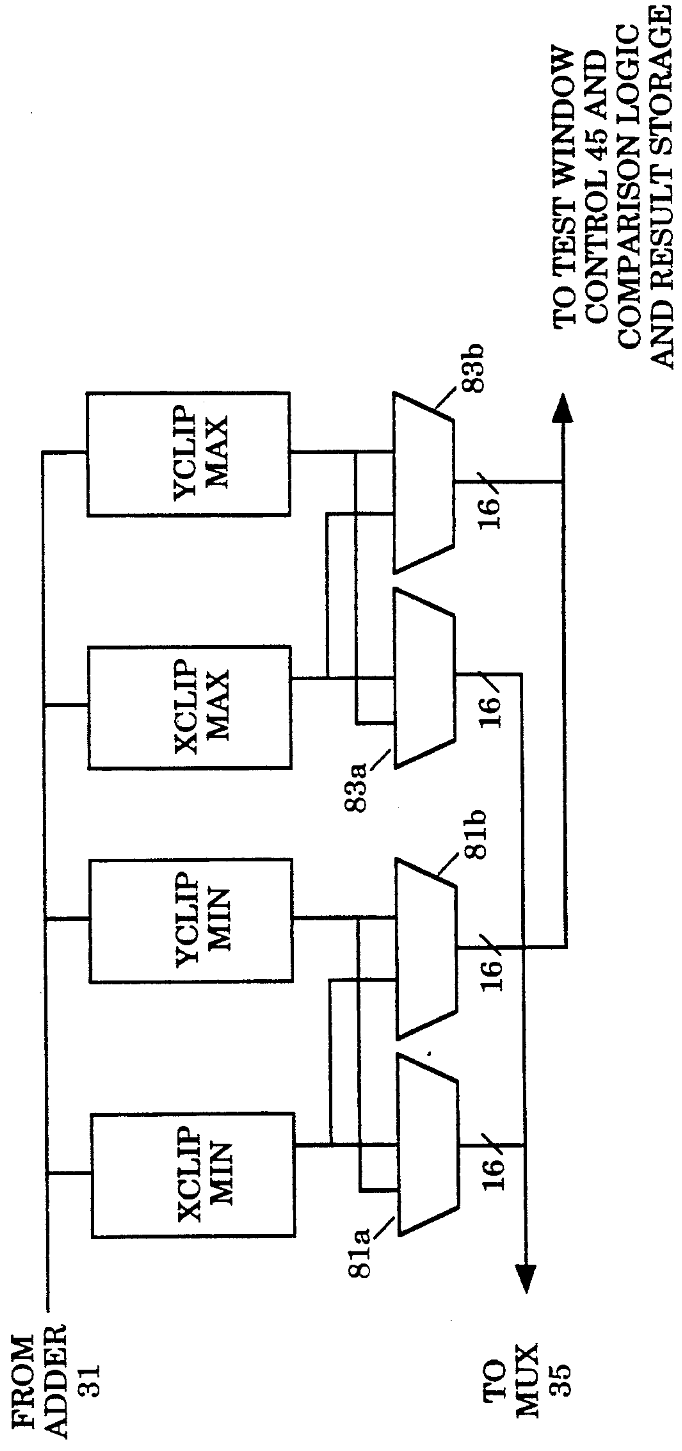
FIG. 5 is a detailed block diagram of clip coordinate registers 39.

Clip coordinate registers, as shown in FIG. 5 comprises four registers, XClipMin, XClipMax, YClipMin, YClipMax and multiplexors 81*a*, 81*b*, 83*a* and 83*b*. The values XClipMin, XClipMax, YChpMin, YClipMax, which are stored in the aforesaid registers with the same name, respectively define the left, right, top and bottom of the currently active window. These values are generated by the CPU and are input to adder 31 which adds 0 to these values for loading the registers XClipMin, XClipMax, YClipMin, and YClipMax as described above. Multiplexors 81*a* and 83*a* on the one hand, and multiplexors 81*b* and 83*b* on the other, select XClipMin and XClipMax or YClipMin and YClipMax, depending on control signals generated by loading control state machine 33 and comparison control state machine 49 respectively. The values from multiplexors 81*a* and 83*a* are sent to multiplexor 35, while the values from multiplexors 81*b* and 83*b* are sent to comparison logic and result storage 47 and test window control 45.

RASTER OFFSET REGISTERS 41

Figure 6:
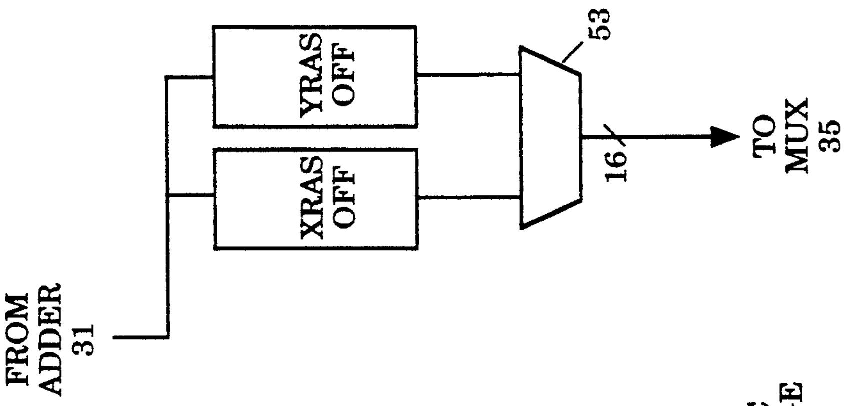
FIG. 6 is a detailed block diagram of raster offset register 41.

Raster offset registers 41, as shown in FIG. 6 comprises two registers, XRasOff, YRasOff, and multiplexor 53. The values XRasOff and YRasOff, which are stored in the aforesaid registers with the same name, respectively define the X and Y offset to be added (when desired) to DataIn before storage into each of the four sets of X,Y coordinates in X/Y coordinate registers 37. These values are generated by the CPU for storage in XRasOff and YRasOff. Multiplexor 53 selects XRasOff or YRasOff depending on control signals generated by loading control state machine 33. The value selected by multiplexor 53 is sent to multiplexor 35.

TEST WINDOW CONTROL 45

Figure 7:
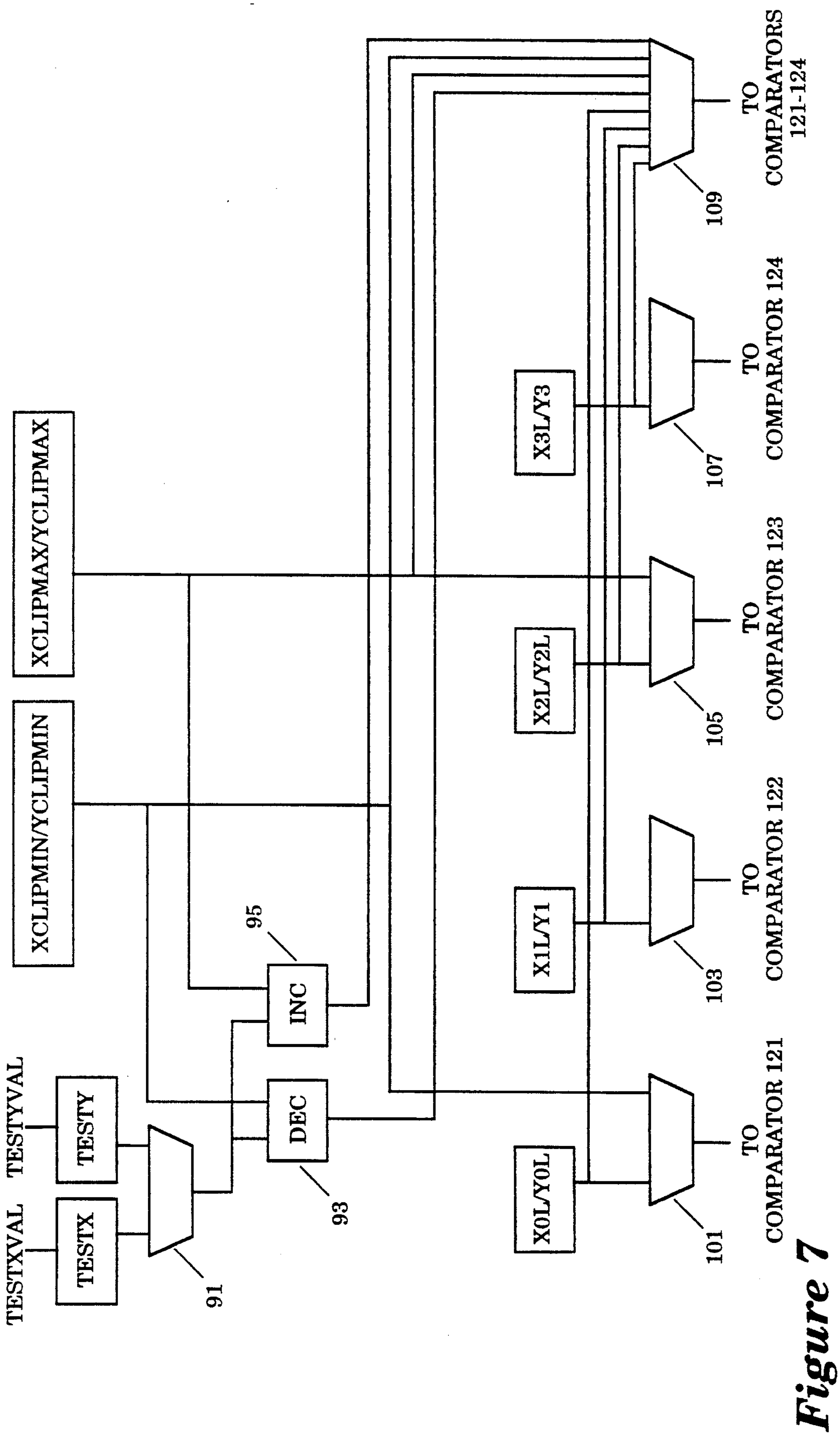
FIG. 7 is a detailed block diagram of text window control 45.

Test window control 45 will now be described with reference to FIG. 7. The CPU generates the values testXVal and testYVal which offset a predetermined distance, i.e. number of pixels, above and below (for testYVal) and to the right and left (for testXVal) of the currently active clipping window. That is, for a given window on a display, there is a $\Delta X$ and $\Delta Y$ which define a test window surrounding the real clip window. The purpose of this test window is to eliminate, whenever it is beneficial to do so, the need for the hardware to calculate the location of objects or portions of the objects which are outside the clipping window. Details concerning the use of the test window are described in copending application Ser. No. 297,093 filed Jan. 13, 1989.

The 4-bit values testXVal and testYVal are stored in the 4-bit registers testX and testY respectively. Multiplexer 91 selects one of the registers testX or testY depending upon whether the X coordinates or the Y coordinates are being operated upon as determined by the signal MUX Enable generated by the loading control state machine 33. The output of multiplexer 91 is input into decrementor 93 and incrementor 95. Decrementor 93 has as a second input the value XClipMin or YClipMin and incrementor 95 has as a second input the value XClipMax or YClipMax, again depending upon whether X or Y coordinates are being operated upon as determined by the signal MUX Enable generated by the loading control state machine 33. The outputs generated by decrementor 93 and incrementor 95 will be referred to as XTestMin, YTestMin and XTestMax, YTestMax respectively. Decrementor 91 creates the values XTestMin and YTestMin by subtracting from XClipMin and YClipMin a value equal to 2 raised to (testX−1) and (testY−1) power respectively. Similarly, incrementor 93 creates the values XTestMax and YTestMax by adding to XClipMax and YClipMax a value equal to 2 raised to the (testX−1) and (testY−1) power respectively. (i.e., $2^{(testX-1)}$ or $2^{(testY-1)}$).

LOADING CONTROL STATE MACHINE 33 AND INDEX LOGIC 43

Loading control state machine 33 generates the control signals, MUX Enable, Index and Register Enable. MUX Enable is a set of control signals, one of which causes the various multiplexors in raster offset registers 41, X/Y coordinate registers 37 and clip coordinate registers 39 to select their respective X inputs or Y inputs; a second of which causes multiplexor 35 to select one of the inputs from raster offset registers 41, X/Y coordinate registers 37 or clip coordinate registers 39. Index is a single control signal which causes an index register in index logic 43 to increment by 1 between for each of the values 0, 1 and 2, and if the value is 3, to reset to 0 (modulo 4). Register Enable is a set of control signals, one for each of the registers in raster offset registers 41, X/Y coordinate registers 37 and clip coordinate registers 39, enabling each such register to load the 16 bit value on the line from adder 31.

The operation of load control state machine 33 and index logic 43 will now be described by way of an example from which the implementation details should be apparent. As noted above, images to be drawn are defined as being made of one or more objects having four pairs of vertices, $(X_0,Y_0)$-$(X_3,Y_3)$. Objects may be points, lines, triangles, rectangles or quadrilaterals. For points, the four pairs of vertices are identical For lines, there are only two pairs of unique vertices. Four sided quadrilaterals have four unique vertices. A rectangle represents a special case of quadrilateral wherein there are only two unique X coordinates and two unique Y coordinates (rectangles can be defined by a pair of vertices defining diagonally opposite corners). For triangles, there are only three pairs of unique vertices.

The index value specifies which registers to enable based upon the type of object being defined. For proper operation, Y values precede X values. Except for rectangles, the index register is incremented after the X values have been loaded in the appropriate registers. For rectangles, the index register is incremented after both X and Y values. In this connection, the following table sets forth for each type of object, the X registers which are enabled for each index register value. Although not shown, the enabled Y registers would correspond to the enabled X registers.

TABLE I

| | Index Value At Time Of Load | | | |
|---|---|---|---|---|
| Object Type | 0 | 1 | 2 | 3 |
| point | X0, X1, X2, X3 | X1, X2, X3, X0 | X2, X3, X0, X1 | X3, X0, X1, X2 |
| line | X0, X1, X2 | X1, X2, X3 | X2, X3, X0 | X3, X0, X1 |
| quadrilateral | X0 | X1 | X2 | X3 |
| rectangle | X0. X1 | X1. X2 | X2. X3 | X3. X0 |

An important point that can be seen in Table I is that the coordinate pointed to by the index register is always written. The type of write (point, line, triangle, etc.) indicates how many subsequent registers (modulo 4) will also be written. For example, if the index is 2, at the time a line X write is received, then three registers will be written, namely X2, (X2+1) modulo 4 and (X2+2) modulo 4 or X2, X3 and X0. A quadrilateral write to Y would only affect Y2.

Examples 1-3 below will explain the role of the index register when defining an object. Each line of the example indicates the intended write operation, the index register value utilized by the loading control state machine to govern the loading of the coordinate registers, the values stored in the coordinate registers after the write, and the index value after the write cycle concludes. The mnemonics for the write commands are PntX or PntY to indicate a point write, LineX or LineY for a line write, TriX and TriY for a triangle write, QuadX and QuadY for a quadrilateral write, and RectX and RectY for a rectangle write operation. The actual write operation identified by each write command is actually a multi-clock cycle operation as will be described later. For these examples though, the execution time of the command is of no relevance.

As a means of clarifying the interpretation of these examples, the first one will be described. From this description the interpretation of Examples 2 and 3 should be readily apparent.

At the time the PntY(6) command is received, all coordinate registers contain the value "0" and the index is equal to "1". The PntY(6) command says that a point of value 6 should be loaded into the Y coordinate registers. Since the index is a 1, Table I indicates that the incoming value (6) should be stored into Y1, Y2, Y3 and Y0. The next command received, PntX(3), then says to load the point 3 into X1, X2, X3 and X0. As is the case after all indexed X coordinate writes, the index is incremented (modulo 4) at the end of the write cycle. The next write command is a LineY(9). The index for this load is 2 and Table I indicates the loading of 9 into Y2, Y3 and Y0. The final write command for this example is LineX(7). Table I indicates the loading of 7 into X2, X3 and X0 after which the index register is again incremented. The final state of the coordinate registers identify two unique vertices (3 vertices at (7, 9) and one at (3, 6)). Geometrically, this is a line with endpoints at (7, 9) and (3, 6) as was intended.

| Command | X0 | X1 | X2 | X3 | Y0 | Y1 | Y2 | Y3 | Index Before Write | Index After Write |
|---|---|---|---|---|---|---|---|---|---|---|
| | Example 1 Specifying a line (3, 6) (7, 9) | | | | | | | | | |
| — | 0 | 0 | 0 | 0 | 0 | 0 | 0 | 0 | 01 | 01 |
| write PntY(6) | 0 | 0 | 0 | 0 | 6 | 6 | 6 | 6 | 01 | 01 |
| write PntX(3) | 3 | 3 | 3 | 3 | 6 | 6 | 6 | 6 | 01 | 02 |
| write LineY(9) | 3 | 3 | 3 | 3 | 9 | 6 | 9 | 9 | 02 | 02 |
| write LineX(7) | 7 | 3 | 7 | 7 | 9 | 6 | 9 | 9 | 02 | 03 |
| | Example 2 Specifying a triangle (1, 5) (9, 3) (4, 6) | | | | | | | | | |
| — | 7 | 3 | 7 | 7 | 9 | 6 | 9 | 9 | 03 | 03 |
| write TriY(5) | 7 | 3 | 7 | 7 | 5 | 6 | 9 | 5 | 03 | 03 |
| write TriX(1) | 1 | 3 | 7 | 1 | 5 | 6 | 9 | 5 | 03 | 00 |
| write TriY(3) | 1 | 3 | 7 | 1 | 3 | 3 | 9 | 5 | 00 | 00 |
| write TriX(9) | 9 | 9 | 7 | 1 | 3 | 3 | 9 | 5 | 00 | 01 |
| write TriY(6) | 9 | 9 | 7 | 1 | 3 | 6 | 6 | 5 | 01 | 01 |
| write TriX(4) | 9 | 4 | 4 | 1 | 3 | 6 | 6 | 5 | 01 | 02 |
| | Example 3 Specifying a Rectangle (0, 7) (8, 7) (8, 1) (0, 1) | | | | | | | | | |
| — | 9 | 4 | 4 | 1 | 3 | 6 | 6 | 5 | 02 | 02 |
| write RectY(1) | 9 | 4 | 4 | 1 | 3 | 6 | 1 | 1 | 02 | 03 |
| write RectX(0) | 0 | 4 | 4 | 0 | 3 | 6 | 1 | 1 | 03 | 00 |
| write RectY(7) | 0 | 4 | 4 | 0 | 7 | 7 | 1 | 1 | 00 | 01 |
| write RectX(8) | 0 | 8 | 8 | 0 | 7 | 7 | 1 | 1 | 01 | 02 |

Although in Example 1, the index register is arbitrarily 1 when the first coordinate is received, the index register in index logic 43 may be initialized based upon a value placed on DataIn if instructed by the CPU. (It is worth noting, however, that proper operation of this invention is totally independent of the initial value of the index register when a loading sequence is initiated.). It is also assumed in this example that XRasOff and YRasOff contain the value 0 so as not to obscure the operation of this circuitry.

Loading control state machine 33 in conjunction with comparison logic state machine 49 controls a pipelining scheme which in addition to loading the various registers described above, also controls the selection of registers and corresponding multiplexors necessary for the proper operation of comparison logic and result storage 47 and status generation logic 51. Additionally, when it is desired to not utilize the raster offset capability of the present invention, it is necessary to force the addition of 0's to the incoming data for storage into the X and Y coordinate registers prior to performing the comparisons performed by comparison logic and result storage 47.

In this connection, the MUX Enable, and Register Enable control signals generated by loading control state machine 33 and comparison logic state machine 49 may be ascertained from the timing sequence table set forth in FIG. 9 and the following list showing the order of processing performed by coordinate staging section 15 for each entered Y coordinate.

1. Receive Y coordinate on DataIn
2. Add the low order 16 bits of the received Y coordinate to:
   a) YRasOff (lower 16-bits) or
   b) the low order 16 bits of Y0L-Y3L pointed to by (index−1), or
   c) 0's
3. Add the high order 16 bits of the received Y coordinate to:
   a) YRasOff (sign extended upper 16-bits) or
   b) the high order 16 bits of Y0H-Y3H pointed to by (index−1) or
   c) 0's and
   compare the result of step 2 to the other Y coordinates
4. Compare the result of step 2 to YClipMin, YTestMin, YClipMax, and YTestMax and examine the upper 18 bits of the result of steps 2 and 3 for all 1's and all 0's.

In steps 2 and 3 above, the choices a), b) or c) are made as follows. For non-relative writes to an indexed register (PNT, LINE, TRI, QUAD, RECT) choice a) is selected. For a relative write to an indexed register (RELPNT, RECLINE, RELTRI, RELQUAD, REERECT) choice b) is selected. All other writes select choice c). The loading of an X coordinate follows the same flow.

With the foregoing restrictions and definitions in mind, and assuming that the index register value in index logic 43 is '01' and registers (X0,Y0)-(X3,Y3) as described above with reference to FIG. 4 are all 0, the following sequence of events takes place to load the registers so as to define a line having endpoints whose X,Y coordinates are (3,6) (7,9) as in Example 1.

At clock cycle 0, the command write PntY(6) places the value 6 on DataIn, and causes the register address input to loading control state machine 33 to contain a value indicating that the incoming data is a Y point. At clock cycle 1 (and referring to FIG. 3), multiplexor 36 is instructed to select the low order 16 bits on DataIn and multiplexors 35 (i.e., multiplexors 35_a_ and 35_b_) and 40 and logic gate 42 are instructed to pass the lower 16 bits of YRasOff. Thus, during clock cycle 1, adder 31 adds the outputs from multiplexor 36 and logic gate 42 and places the result at its output. At the end of clock cycle 1, registers Y0L-Y3L are enabled and loaded with the value from adder 31, i.e., 6 representing the low order bits of the value 6 that was on DataIn. At clock cycle 2, multiplexor 36 is instructed to select the high order 16 bits on DataIn and multiplexors 35 and 40 and logic gate 42 are instructed to pass the sign extended upper 16 bits of YRasOff. Thus, during clock cycle 2, adder 31 adds the outputs from multiplexor 36 and logic gate 42 and places the result at its output. At the end of clock cycle 2, registers Y0H–Y3H are enabled and loaded with the value from the output of adder 31. At cycle 3, the command write PntX(3) places the value 3 on DataIn, and causes the register address input to loading control state machine 33 to contain a value indicating that the incoming data is an X point. Also at clock cycle 3, multiplexor 36 is instructed to select the low order 16 bits on DataIn and multiplexors 35 and 40 and logic gate 42 are instructed to pass the lower 16 bits of XRasOff. During clock cycle 3, adder 31 adds the outputs from multiplexor 36 and logic gate 42 and places the result at its output. At the end of clock cycle 3, registers X0L–X3L are enabled and loaded with the value from adder 31, i.e., 3 representing the low order bits of the value 3 that was on DataIn. At clock cycle 4, multiplexor 36 is instructed to select the high order 16 bits on DataIn and multiplexors 35 and 40 and logic gate 42 are instructed to pass the sign extended upper 16 bits of XRasOff. At clock cycle 4, adder 31 adds the outputs from multiplexor 36 and logic gate 42 and places the result at its output. During clock cycle 4, registers X0H–X3H are enabled and loaded with the value from the output of adder 31, and the index register is incremented. At clock cycle 5, the command write LineY(9) places the value 9 on DataIn, and causes the register address input to loading control state machine 33 to contain a value indicating that the incoming data is a Y line. At clock cycle 5, multiplexor 36 is instructed to select the low order 16 bits on DataIn and multiplexors 35 and 40 and logic gate 42 are instructed to pass the lower 16 bits of YRasOff. During clock cycle 5, adder 31 adds the outputs from multiplexor 36 and logic gate 42 and places the result at its output. At the end of clock cycle 5, registers Y2L, Y3L and Y0L are enabled and loaded with the value from adder 31, i.e., 9 representing the low order bits of the value 9 that was on DataIn. At clock cycle 6, multiplexor 36 is instructed to select the high order 16 bits on DataIn and multiplexors 35 and 40 and logic gate 42 are instructed to pass the sign extended upper 16 bits of YRasOff. At clock cycle 6, adder 31 adds the outputs from multiplexor 36 and logic gate 42 and places the result at its output. During clock cycle 6, registers Y2H, Y3H and Y0H are enabled and loaded with the value from the output of adder 31. At clock cycle 7, the command write LineX(7) places the value 7 on DataIn, and causes the register address input to loading control state machine 33 to contain a value indicating that the incoming data is an X line. In a like manner registers X2L, X3L and X0L are eventually enabled to load the value 7 after which the index register is incremented from 2 to 3 as shown above. Loading X/Y coordinate registers for other objects follows the same pipeline scheme described above. Examples for triangles and rectangles are given in Examples 2 and 3 above. In a similar manner, quadrilateral objects are also loaded.

Raster offset registers 41 and clip coordinate registers 39 are loaded in a similar manner as X/Y coordinate registers 37 as described above, however, logic gate 42 is instructed to force 0's for each add cycle. (i.e., absolute loading)

The present invention, by use of the index register in index logic 43 also performs relative addressing which provides an efficient mechanism for displaying duplicates of objects. Relative addressing is best described by way of an example as follows. The three vertices of a triangle may be defined as $(X_0,Y_0)$, $(X_1,Y_1)$ and $(X_2,Y_2)$. To duplicate this object 50 times at different locations on the display, it would be necessary to store 150 pairs of X,Y coordinates. Using relative addressing, one vertex is defined as the origin $(X_0,Y_0)$, and the second and third vertices are defined as offsets from the previous vertex, i.e., $\Delta X_{01},\Delta Y_{01}$ and $\Delta X_{23},\Delta Y_{23}$. To duplicate the object 50 times, all that needs to be stored are the two offset pairs and a new $X_0,Y_0$ for each duplicate (i.e. fifty object origins plus two offset pairs total).

This can be accomplished in the present invention by first storing the origin coordinate pair vertex in one of the register pairs within X/Y coordinate registers 37 using an indexed loading style (i.e., PntY, PntX). The two offset vertices are subsequently stored relative to the vertex pointed to by the current value of the index register. This is accomplished by selecting the vertex pointed to by (index −1) to be added to DataIn prior to register loading. The vertex referenced by (index −1) is guaranteed to have been loaded on the previous indexed write irrespective of the type of write (PNT, LINE, etc.) and is, therefore, the vertex from which the relative offset applies.

COMPARISON LOGIC AND RESULT STORAGE LOGIC 47

Comparison logic and result storage logic 47 will now be described with reference to FIGS. 7 and 8. Comparison logic and result storage logic 47 comprises multiplexors 101, 103, 105, 107 and 109 (see FIG. 7), and comparators 121–124, multiplexors 131–146 and registers R1–R44 (see FIG. 8).

Registers R1–R44 store the results of the operation of comparators 121–124 as shown in Table II:

TABLE II

| | | | |
|---|---|---|---|
| R1 | X0:XClipMin | R23 | Y0:YClipMin |
| R2 | X0:XTestMin | R24 | Y0:YTestMin |
| R3 | X0:XClipMax | R25 | Y0:YClipMax |
| R4 | X0:XTestMax | R26 | Y0:YTestMax |
| R5 | X1:XClipMin | R27 | Y1:YClipMin |
| R6 | X1:XTestMin | R28 | Y1:YTestMin |
| R7 | X1:XClipMax | R29 | Y1:YClipMax |
| R8 | X1:XTestMax | R30 | Y1:YTestMax |
| R9 | X2:XClipMin | R31 | Y2:YClipMin |
| R10 | X2:XTestMin | R32 | Y2:YTestMin |
| R11 | X2:XClipMax | R33 | Y2:YClipMax |
| R12 | X2:XTestMax | R34 | Y2:YTestMax |
| R13 | X3:XClipMin | R35 | Y3:YClipMin |
| R14 | X3:XTestMin | R36 | Y3:YTestMin |
| R15 | X3:XClipMax | R37 | Y3:YClipMax |
| R16 | X3:XTestMax | R38 | Y3:YTestMax |
| R17 | X0:X1 | R39 | Y0:Y1 |
| R18 | X0:X2 | R40 | Y0:Y2 |
| R19 | X0:X3 | 441 | Y0:Y3 |
| R20 | X1:X2 | R42 | Y1:Y2 |
| R21 | X1:X3 | R43 | Y1:Y3 |
| R22 | X2:X3 | R44 | Y2:Y3 |

In Table II, excepting for the comparisons involving XClipMin/Max, YClipMin/Max, XTestMin/Max, and YTestMin/Max which store a one bit result, the indicated register stores a two bit result of a comparison between the two indicated values. If the value on the left of the colon is greater than the value to the right of the colon, the binary value stored in the corresponding register is '10'; if the value on the left of the colon is less than the value to the right of the colon, the binary value stored in the corresponding register is '01'; if the two values are equal, the binary value stored in the corresponding register is '00'. For XClipMin, YClipMin, XTestMin, and YTestMin, if the coordinate value compared is less, a '1' is stored, otherwise, a '0' is stored. For XClipMax and YClipMax, XTestMax, YTestMax if the value compared is greater, a '1' is stored, otherwise, a '0' is stored.

The inputs to multiplexors 101, 103, 105, 107 and 109 are from X/Y coordinate registers 37, namely X0L,Y0L–X3L,Y3L, clip coordinate registers 39, namely XClipMin,YClipMin and XClipMax,YClipMax and test window control 45, namely XTestMin, YTestMin, XTestMax and YTestMax. Of course, at any one time, the inputs to multiplexors 101, 103, 105, 107 and 109 are either X values or Y values as described above, based upon a MUX Enable signal generated by comparison control state machine 49.

Comparator 121 compares multiplexor 101 output and multiplexor 109 output. Similarly, comparators 122–124 compare multiplexor 103, 105 and 107 outputs on the one hand and multiplexor 109 output on the other. The outputs from comparators 121–124 are input to multiplexors 131–146 which direct the appropriate data to registers R1–R44 to be loaded as follows.

Figure 8:
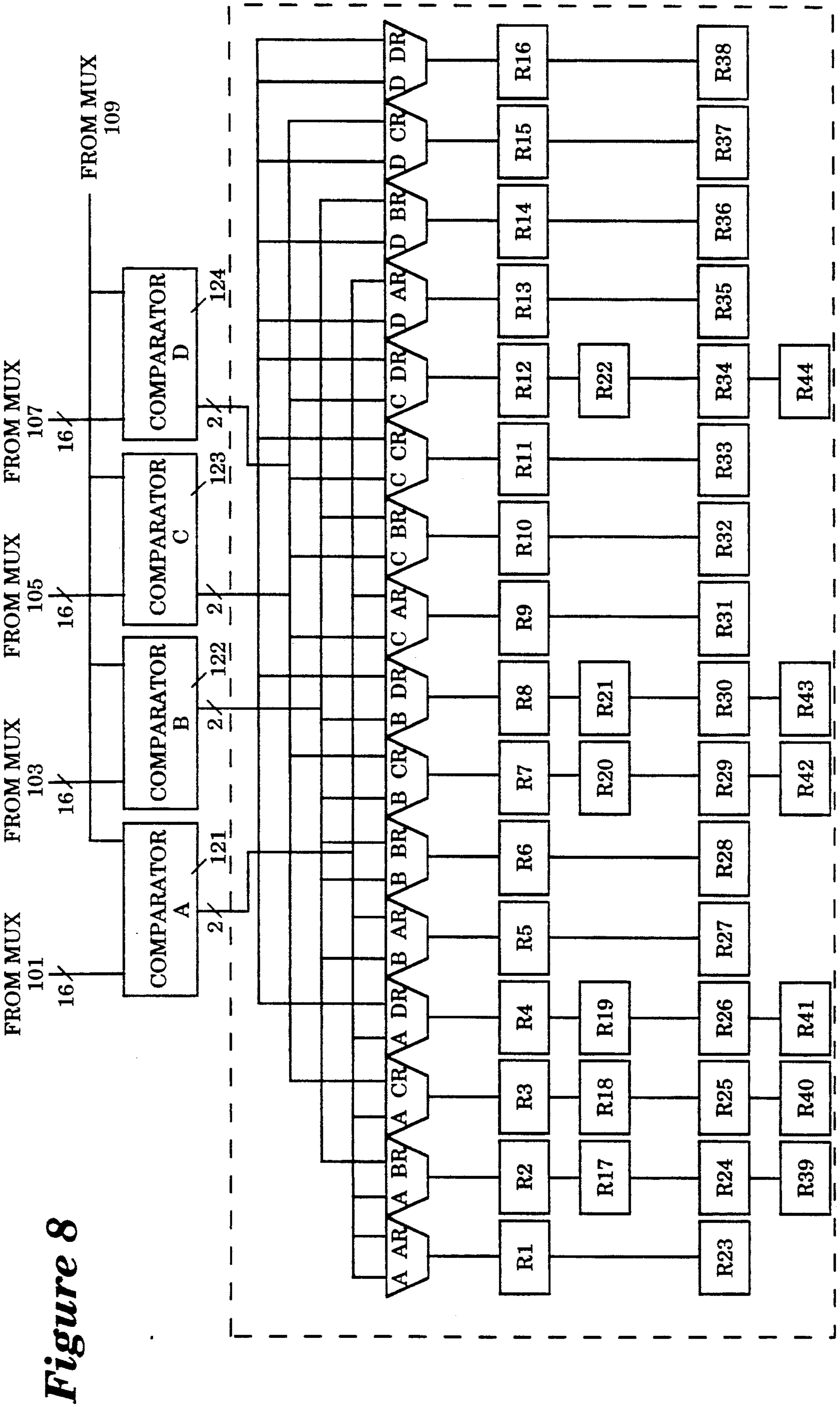
FIG. 8 is a detailed block diagram of comparison logic and result storage 47.

The output from comparator 121 is connected to multiplexors 131–135, 139 and 143 which are used to load registers R1, R2, R3, R4, R5, R9, R13, R17, R18, and R19, for X values and registers R23, R24, R25, R26, R27, R31, R35, R39, R40, and R41 for Y values as shown in FIG. 8 and Table II below. In Table III, A, B, C, and D refer to comparators 121, 122, 123 and 124 respectively.

The output from comparator 122 is connected to multiplexors 132, 135, 136, 137, 138, 140, and 144 which are used to load registers R2, R5, R6, R7, R8, R10, R14, R17, R20, and R21 for X values and registers R24, R27, R28, R29, R30, R32, R36, R39, R42 and R43 for Y values as shown in FIG. 8 and Table III.

The output from comparator 123 is connected to multiplexors 133, 137, 139, 140, 142, and 145 which are used to load registers R3, R7, R9, R10, R12, R15, R18, R20 and R22 for X values and registers R25, R29, R31, R32, , R34, R37, R40, R42, and R44 for Y values as shown in FIG. 8 and Table III.

The output from comparator 124 is connected to multiplexors 134, 138, 142, 143, 144, 145 and 146 which are used to load registers R4, R8, R12, R13, R14, R15, R16, R19, R21, and R22 for X values and registers R26, R30, R34, R35, R36, R37, R38, R41, R43 and R44 for Y values as shown in FIG. 8 and Table III.

The comparisons done and stored are those required by coordinate sequencing block 17 and functional addressing block 19 in order to properly execute supported operations (DRAW, also known as quadrilateral rendering, or BLIT) and perform proper clipping.

COMPARISON CONTROL STATE MACHINE 49

Comparison control state machine 49 is logic which enables the various comparators, multiplexors and registers in comparison logic and result storage 47. A truth table for absolute loading of the coordinate and clipping registers by the comparison control state machine 49 is shown in Table III for clock cycles 0 and 1, with comparators 121–124 referenced A, B, C and D respectively. Table III sets forth the output of each comparator 121–124 for each of the inputs X0L–X3L, XClipMin, XClipMax, XTestMin and XTestMax. In this connection, although FIG. 8 shows that the outputs of multiplexors 101, 103, 105 and 107 are input into one side of comparators 121–124, with the output of comparator 109 being input into the other side. For consistency, it is necessary to store the comparisons of X0L to X1L, X1L to X2L and X2L to X3L etc., rather than the other way around (e.g., X1L to X0L). For this reason, when the column labeled reverse is "yes," the outputs from comparators 121–124 are reversed. This is handled by the right input of multiplexors 131–146. The output from the indicated comparators 121–124 are directly input to the left side of the indicated multiplexor 131–146. The right multiplexor input receive the 2 bit output from the indicated comparator in reverse bit order. Thus, the column labeled reverse becomes the truth table for the MUX select line lines for multiplexors 131–146 for absolute coordinate loads.

TABLE III

| COMPARATOR | COMPARISON | REVERSE | CYCLE |
|---|---|---|---|
| WRITE TO X0 | | | |
| B | X0L:X1L | YES | 0 |
| C | X0L:X2L | YES | 0 |
| D | X0L:X3L | YES | 0 |
| A | X0L:XClipMin | YES | 1 |
| B | X0L:XTestMin | YES | 1 |
| C | X0L:XClipMax | YES | 1 |
| D | X0L:XTestMax | YES | 1 |
| WRITE TO X1 | | | |
| A | X1L:X0L | NO | 0 |
| C | X1L:X2L | YES | 0 |
| D | X1L:X3L | YES | 0 |
| A | X1L:XClipMin | YES | 1 |
| B | X1L:XTestMin | YES | 1 |
| C | X1L:XClipMax | YES | 1 |
| D | X1L:XTestMax | YES | 1 |
| WRITE TO X2 | | | |
| A | X2L:X0L | NO | 0 |
| B | X2L:X1L | NO | 0 |
| D | X2L:X3L | YES | 0 |
| A | X2L:XClipMin | YES | 1 |
| B | X2L:XTestMin | YES | 1 |
| C | X2L:XClipMax | YES | 1 |
| D | X2L:XTestMax | YES | 1 |
| WRITE TO X3 | | | |
| A | X3L:X0L | NO | 0 |
| B | X3L:X1L | NO | 0 |
| C | X3L:X2L | NO | 0 |
| A | X3L:XClipMin | YES | 1 |
| B | X3L:XTestMin | YES | 1 |
| C | X3L:XClipMax | YES | 1 |
| D | X3L:XTestMax | YES | 1 |
| WRITE TO XClipMin | | | |
| A | XClipMin:X0L | NO | 0 |
| B | XClipMin:X1L | NO | 0 |
| C | XClipMin:X2L | NO | 0 |
| D | XClipMin:X3L | NO | 0 |
| A | XTestMin:X0L | NO | 1 |
| B | XTestMin:X1L | NO | 1 |
| C | XTestMin:X2L | NO | 1 |
| D | XTestMin:X3L | NO | 1 |
| WRITE TO XClipMax | | | |
| A | XClipMax:X0L | NO | 0 |
| B | XClipMax:X1L | NO | 0 |
| C | XClipMax:X2L | NO | 0 |
| D | XClipMax:X3L | NO | 0 |
| A | XTestMax:X0L | NO | 1 |
| B | XTestMax:X1L | NO | 1 |
| C | XTestMax:X2L | NO | 1 |
| D | XTestMax:X3L | NO | 1 |

The results of Table III are repeated in a similar manner for Y0L–Y3L, YClipMin, YClipMax, YTestMin and YTestMax. FIGS. 9a and 9b show the relative timings of the signals on DataIn, the register loading performed by raster offset registers 41, X/Y coordinate registers 37, clip coordinate registers 39 and comparison logic and result storage 47.

The comparison control state machine supports the indexed loading scheme as previously discussed utilizing both the index register value associated with a write cycle and Table IV. Since the register pointed to by the index register value is always written irrespective of the type of indexed write, the appropriate Mux Enables for Muxes 101, 103, 105 and 107 are selected by the comparison control state machine assuming a single register write to that coordinate. For example, if a rectangle write to X with an index of 3 is received, the comparison logic will operate as if an explicit write to X3 was received and do comparisons X3L vs (X0L, X1L, X2L, XClipMin, XClipMax, XTestMin, XTestMax) as is required. The difference between an absolute loading of a register and an indexed (or relative indexed) load is that in the indexed case, more than one coordinate storage register in 47 may be enabled to receive the comparison results and the multiplexor selects for multiplexors 131–146 are generated according to Table IV instead of Table III.

In the previous example of a rectangle X write with an index of 3, comparison registers (refer to Table II or FIG. 8) R1–R3, R13–R16, R17–R19, and R21–R22 are written. The following registers pairs will store the same individual comparison results: (R17, R21), (R18, R22), (R1, R13), (R2, R14), (R3, R15), and (R4, R16).

TABLE IV

| COMPARATOR | COMPARISON | TYPE | REVERSE | INDEX |
|---|---|---|---|---|
| B | X0:X1 | PNT | yes | — |
| C | X0:X2 | PNT | yes | — |
| D | X0:X3 | PNT | yes | — |
| C | X1:X2 | PNT | yes | — |
| D | X1:X3 | PNT | yes | — |
| D | X2:X3 | PNT | yes | — |
| B | X0:X1 | LINE | yes | 0 |
| C | X0:X2 | LINE | yes | 0 |
| D | X0:X3 | LINE | yes | 0 |
| C | X1:X2 | LINE | yes | 0 |
| D | X1:X3 | LINE | yes | 0 |
| D | X2:X3 | LINE | yes | 0 |
| A | X0:X1 | LINE | no | 1 |
| A | X0:X2 | LINE | no | 1 |
| A | X0:X3 | LINE | no | 1 |
| C | X1:X2 | LINE | yes | 1 |
| D | X1:X3 | LINE | yes | 1 |
| D | X2:X3 | LINE | yes | 1 |
| A | X0:X1 | LINE | yes | 2 |
| C | X0:X2 | LINE | yes | 2 |
| D | X0:X3 | LINE | yes | 2 |
| B | X1:X2 | LINE | no | 2 |
| B | X1:X3 | LINE | no | 2 |
| C | X2:X3 | LINE | yes | 2 |
| A | X0:X1 | LINE | yes | 3 |
| C | X0:X2 | LINE | yes | 3 |
| D | X0:X3 | LINE | yes | 3 |
| C | X1:X2 | LINE | yes | 3 |
| D | X1:X3 | LINE | yes | 3 |
| C | X2:X3 | LINE | no | 3 |
| B | X0:X1 | TRI/RECT | yes | 0 |
| C | X0:X2 | TRI/RECT | yes | 0 |
| D | X0:X3 | TRI/RECT | yes | 0 |
| C | X1:X2 | TRI/RECT | yes | 0 |
| D | X1:X3 | TRI/RECT | yes | 0 |
| A | X0:X1 | TRI/RECT | no | 1 |
| A | X0:X2 | TRI/RECT | no | 1 |
| C | X1:X2 | TRI/RECT | yes | 1 |
| D | X1:X3 | TRI/RECT | yes | 1 |
| D | X2:X3 | TRI/RECT | yes | 1 |
| A | X0:X2 | TRI/RECT | no | 2 |
| A | X0:X3 | TRI/RECT | no | 2 |
| B | X1:X2 | TRI/RECT | no | 2 |
| B | X1:X3 | TRI/RECT | no | 2 |
| D | X2:X3 | TRI/RECT | yes | 2 |
| B | X0:X1 | TRI/RECT | yes | 3 |
| C | X0:X2 | TRI/RECT | yes | 3 |
| D | X0:X3 | TRI/RECT | yes | 3 |
| B | X1:X3 | TRI/RECT | no | 3 |
| C | X2:X3 | TRI/RECT | no | 3 |

TABLE IV-continued

| COMPARATOR | COMPARISON | TYPE | REVERSE | INDEX |
|---|---|---|---|---|
| B | X0:X1 | QUAD | yes | 0 |
| C | X0:X2 | QUAD | yes | 0 |
| D | X0:X3 | QUAD | yes | 0 |
| A | X0:X1 | QUAD | no | 1 |
| C | X1:X2 | QUAD | yes | 1 |
| D | X1:X3 | QUAD | yes | 1 |
| A | X0:X2 | QUAD | no | 2 |
| B | X1:X2 | QUAD | no | 2 |
| D | X2:X3 | QUAD | yes | 2 |
| A | X0:X3 | QUAD | no | 3 |
| B | X1:X3 | QUAD | no | 3 |
| C | X2:X3 | QUAD | no | 3 |

STATUS GENERATION LOGIC 51

Status generation logic 51 generates the control signals HW/SW, Up/R-to-L and HID/VIS. HW/SW is a 2 bit signal indicating whether the operation will be done by the hardware of the present invention or by software. Up/R-to-L is a 2 bit signal indicating whether operation should be processed top to bottom, bottom to top, right to left or left to right. HID/VIS is a two bit signal indicating whether the object to be drawn is hidden, i.e. behind the active clip window or visible. To generate these signals, status generation logic 51 receives as inputs the registers R1–R22 for X coordinates registers R23–R44 for Y coordinates and the four 4 bit signals indicating the upper 18 bits are all 1's and all 0's from X/Y coordinate registers 37. The manner in which status generation logic generates the foregoing control signals will be explained with reference to FIGS. 10–14 which are truth tables for the logic performed by status generation logic 51. The logic circuitry necessary to implement the truth tables of FIGS. 10–14 is well within the capabilities of persons skilled in the relevant art.

Figure 10:
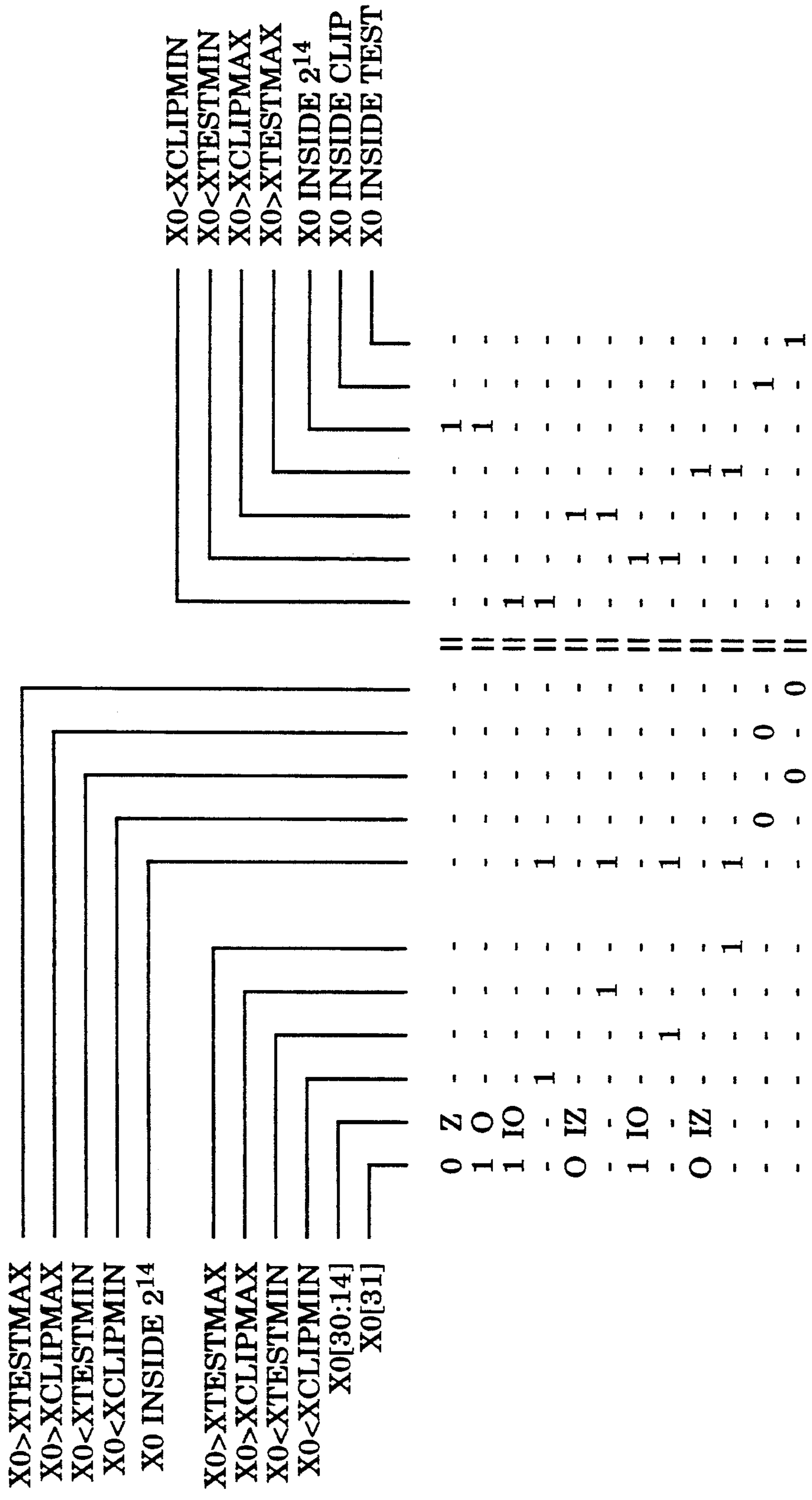
FIG. 10 is a truth table utilizing comparison results for the X0 coordinate.

FIG. 10 is a truth table utilizing comparison results for the X0 coordinate (X0L and X0H). Truth tables utilizing comparison results for the X1–X3 and Y0–Y3 coordinates by substituting those coordinates and using YClipMin, YClipMax, YTestMin and YTestMax in place of XClipMin, XClipMax, XTestMin and XTestMax for the Y coordinates. The left side of the table are the inputs and the right side are the outputs. In the table, the symbol "–" is a don't care; O and !O means the bus bit values are all 1's or not all 1's respectively (from X/Y coordinate registers 37); and Z and !Z means the bus bit values are all 0's or not all 0's respectively (from X/Y coordinate registers 37). "X0 inside $2^{14}$" means the 32 bit X0 coordinate is representable in 15 bits; "X0 inside clip" means X0 is on or inside the clip window X boundaries; "X0 inside test" means X0 is on or inside the test window X boundaries. The outputs "X0<XClipMin", "X0<XTestMin", "X0>XClipMax", and "X0>XTestMax" are fedback and used as inputs. To form the outputs, the inputs on a horizontal line are ANDed together and the outputs in a column are ORed together. Thus, for example, referring to the first two lines of FIG. 10, if X0[31] (i.e., its sign bit) is 0 AND X0[30:14] (i.e., its high order bits 14–30) are all 0's, OR X0[31] is 1 AND X0[30:14] are all 1's, then X0 is inside $2^{14}$. Similarly, referring to the last line of FIG. 10, if X0<XTestMin is 0 (i.e. false) AND X0>XTestMax is 0, then X0 is inside the test window.

Figure 11A:
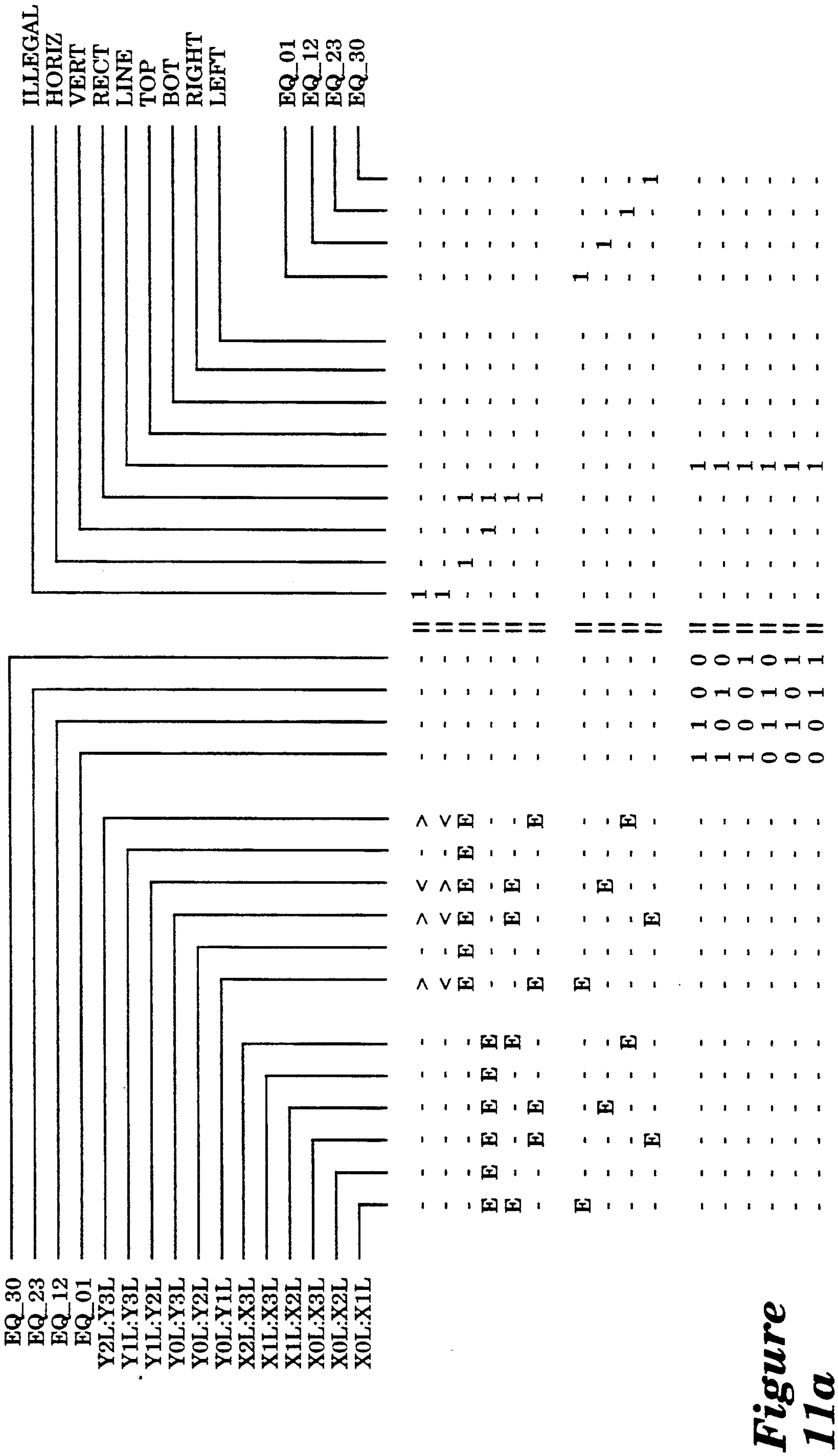
FIGS. 11*a* and 11*b* are a truth table utilizing comparisons between each of the four X vertices and each of the four Y vertices.
Figure 11B:
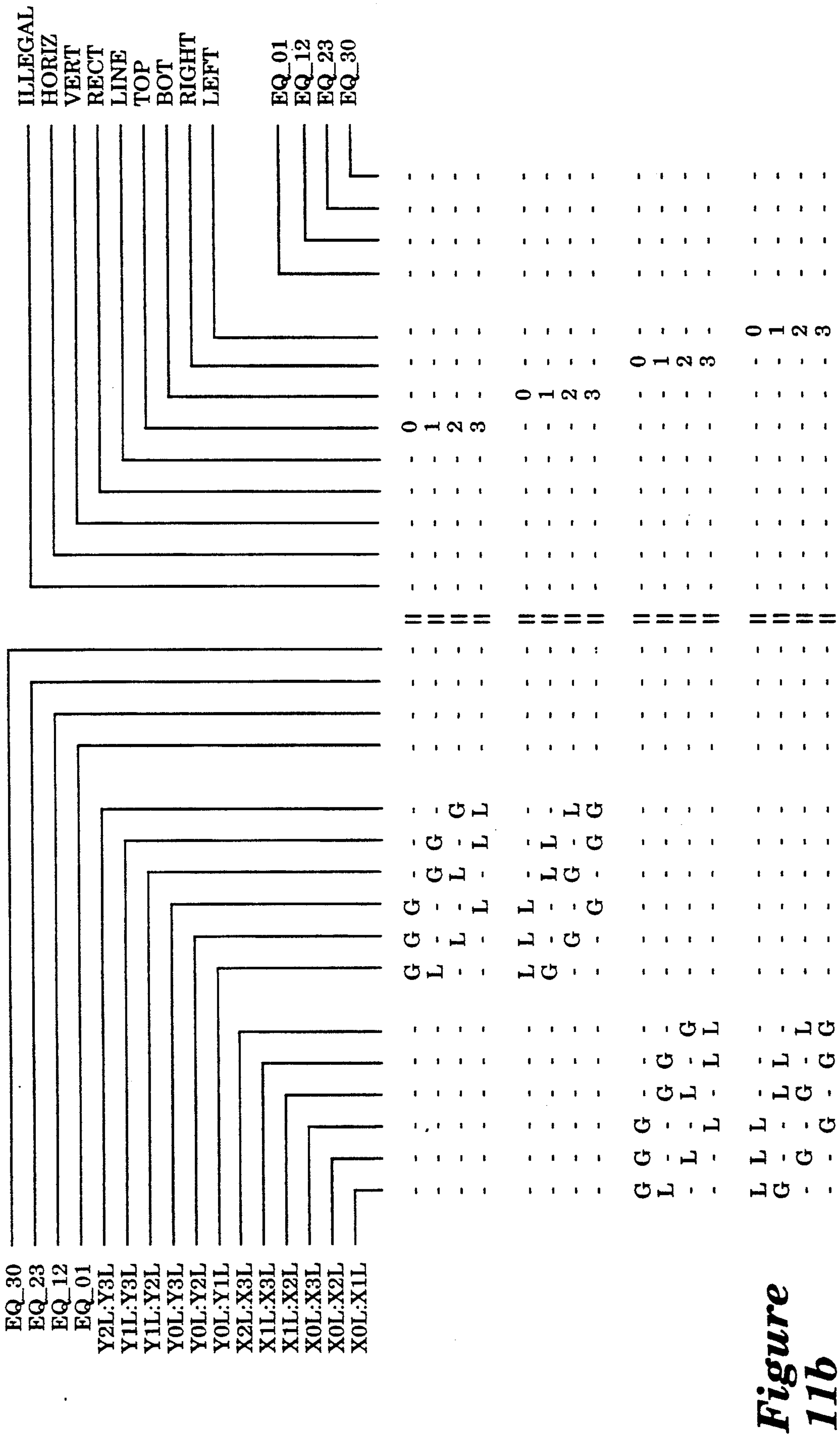
Figure 12A:
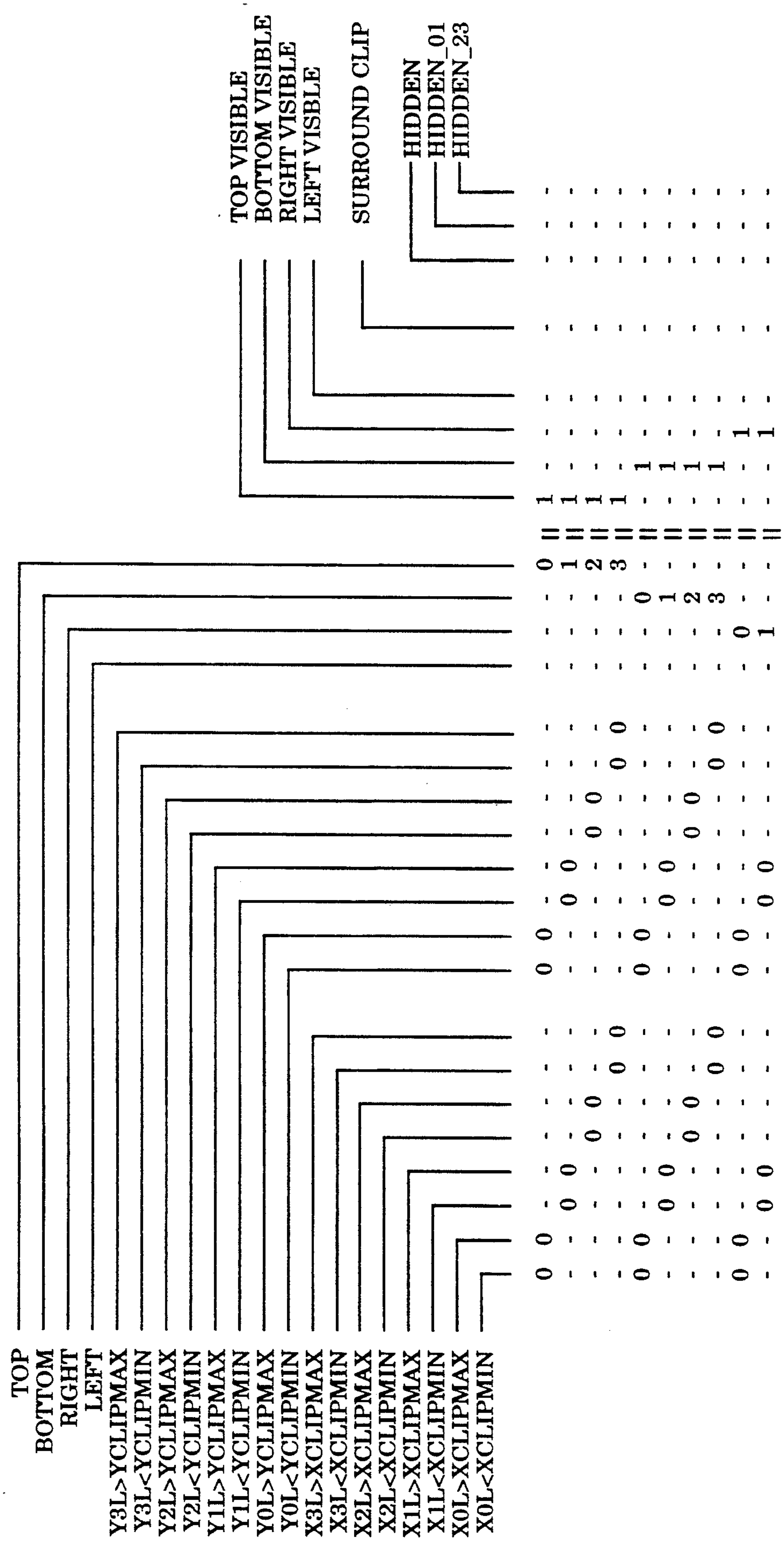
FIGS. 12*a*–12*d* define a truth table utilizing comparisons between the four X and the four Y vertices and the clipping boundaries.
Figure 12B:
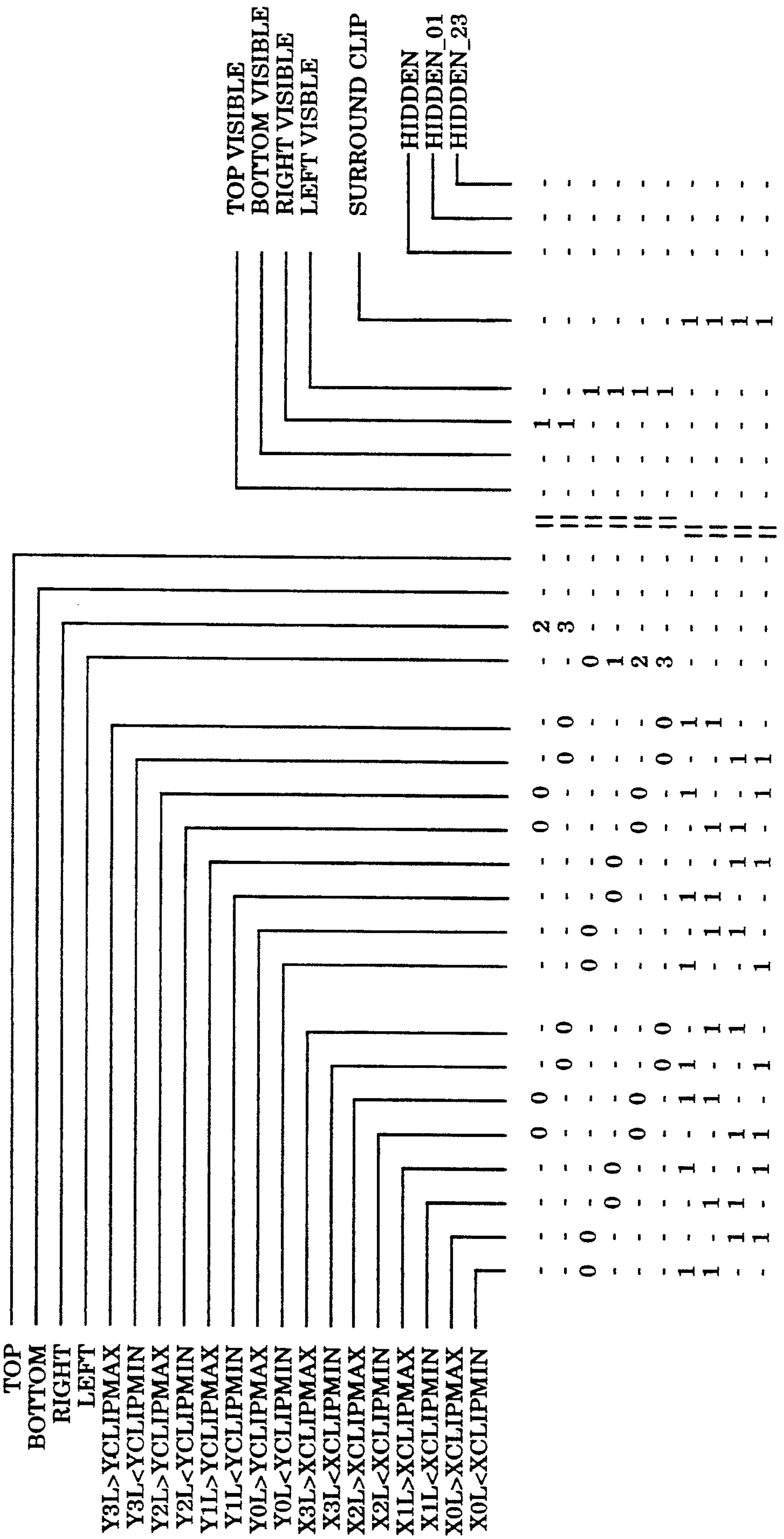
Figure 12C:
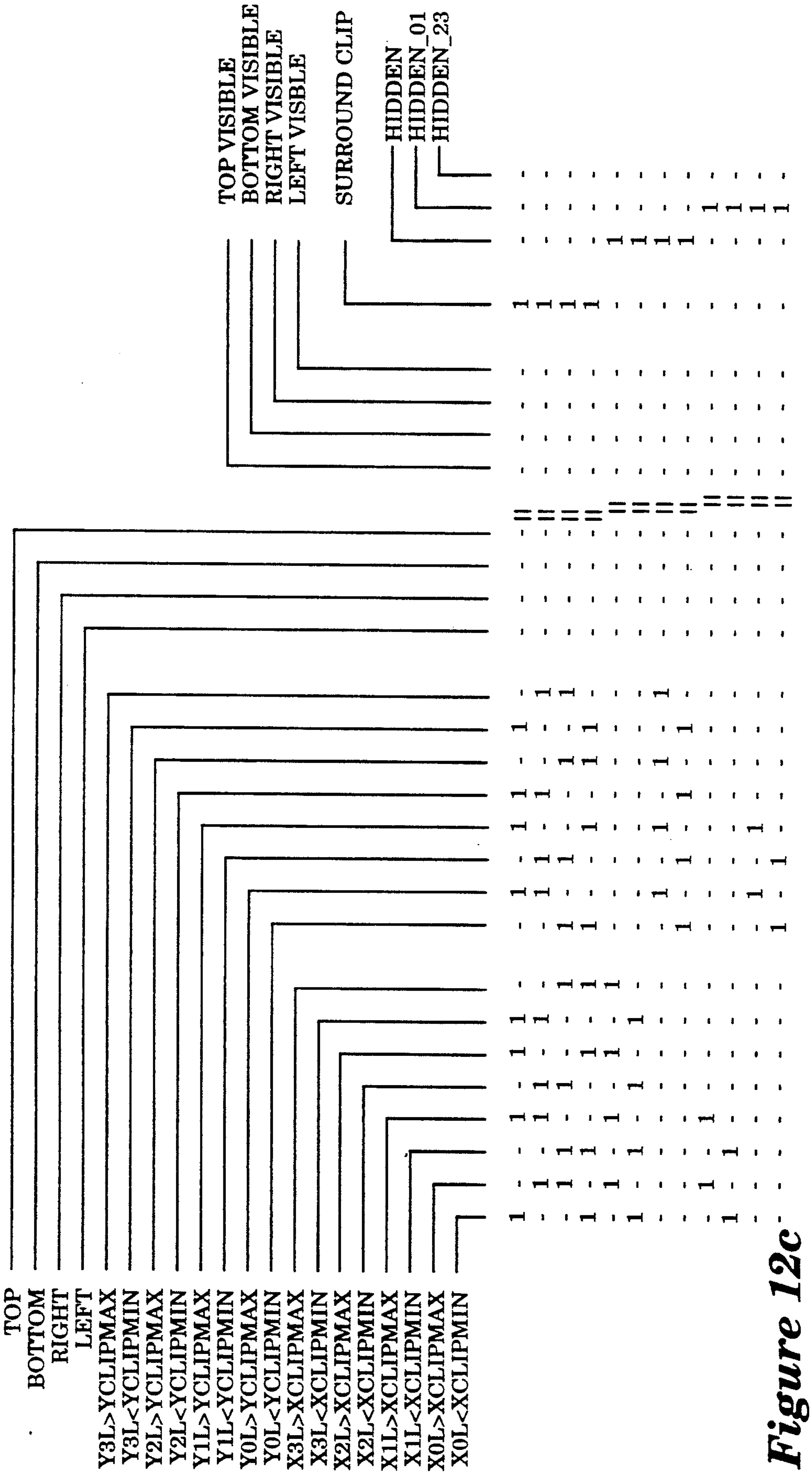
Figure 12D:
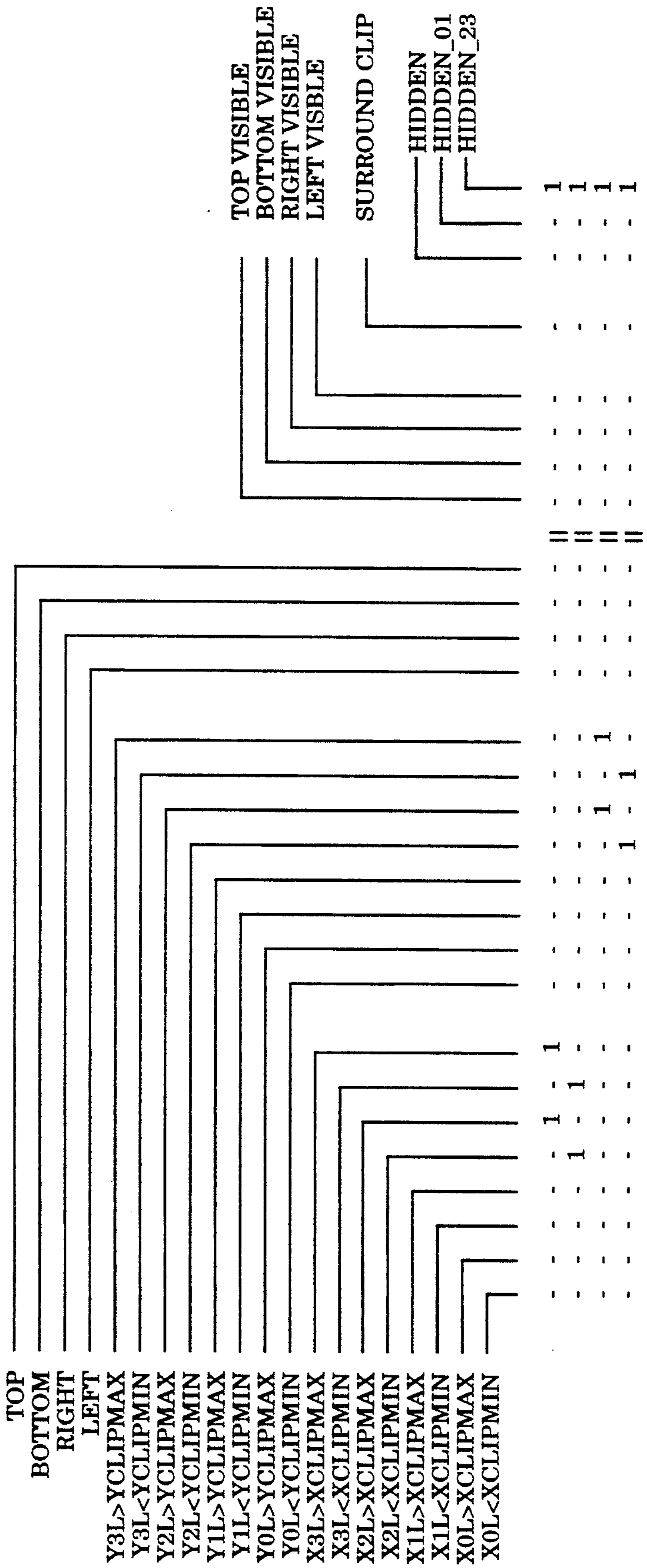

FIGS. 11a and 11b are a truth table utilizing comparisons between each of the four X vertices and each of the four Y vertices. As was the case with FIG. 10, the values on a horizontal input line are ANDed together with the result being a logical 1 (true) or 0 (false) and the indicated outputs (except for top, bottom, right and left) are formed by ORing its corresponding column. The outputs top, bottom, right and left which are shown as 0, 1, 2 or 3 are interpreted as follows. The value 0, 1, 2 or 3 specifies which coordinate of X0-X3 or Y0-Y3 is the largest (top), smallest (bottom), rightmost (right) and leftmost (left). The symbols <,>,E,L and G on the input side indicate that the specified comparison result is less than, greater than, equal to, less than or equal to and greater than or equal to respectively.

Although the meaning of the outputs is defined by the table, the following sets forth in words what each indicated output means:

illegal—means that if a horizontal line is drawn through the object defined by the four pairs of vertices, it would cross two or more edges. An object which forms a bow tie is an example of an object that would cause illegal to be true.

horiz-means all four vertices have the same Y value.

vert-means all four vertices have the same X value.

rect-means the object defined by the four coordinates forms a rectangle.

line-means the object defined by the four coordinates forms a line.

EQ_01 means vertex 0 equals vertex 1. (defines the same point)

EQ_12 means vertex 1 equals vertex 2. (defines the same point)

EQ_23 means vertex 2 equals vertex 3. (defines the same point)

EQ_30 means vertex 3 equals vertex 0. (defines the same point)

FIGS. 12*a*-12*d* define a truth table utilizing comparisons between the four X and the four Y vertices and the clipping boundaries. The inputs top, bottom, right and left are from the truth table of FIGS. 11*a*-11*b*. When the outputs top visible, bottom visible, right visible and left visible are 1 (i.e. true), the object defined by the four coordinate pairs is inside the clip window. When surround clip is 1, the object is outside but surrounding the clip window. Hidden is applicable only for quadrilaterals and indicates that all four vertices are all right, left, top or bottom of the clip window. Hidden_01 (refers to BLIT SRC rectangle) and hidden_23 (refers to BLIT DEST rectangle) have a similar meaning for BLITS.

Figure 13:
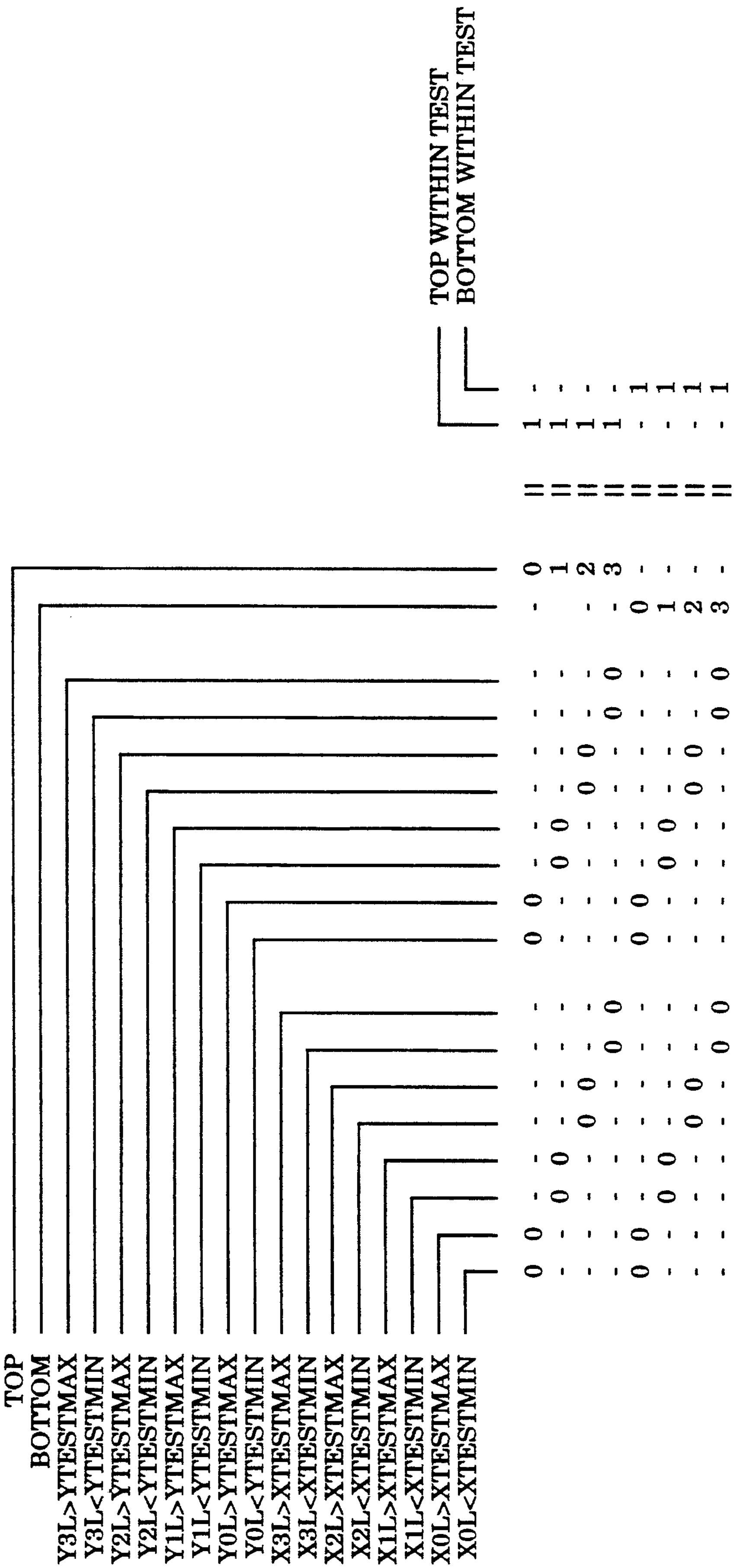
FIG. 13 defines a truth table utilizing comparisons between the four X and the four Y vertices and the test window boundaries.

FIG. 13 defines a truth table utilizing comparisons between the four X and the four Y vertices and the test window boundaries. The outputs "top within test" and "bottom within test", when true, mean that edge of the object is within the top or bottom boundaries of the test window, respectively.

Figure 14:
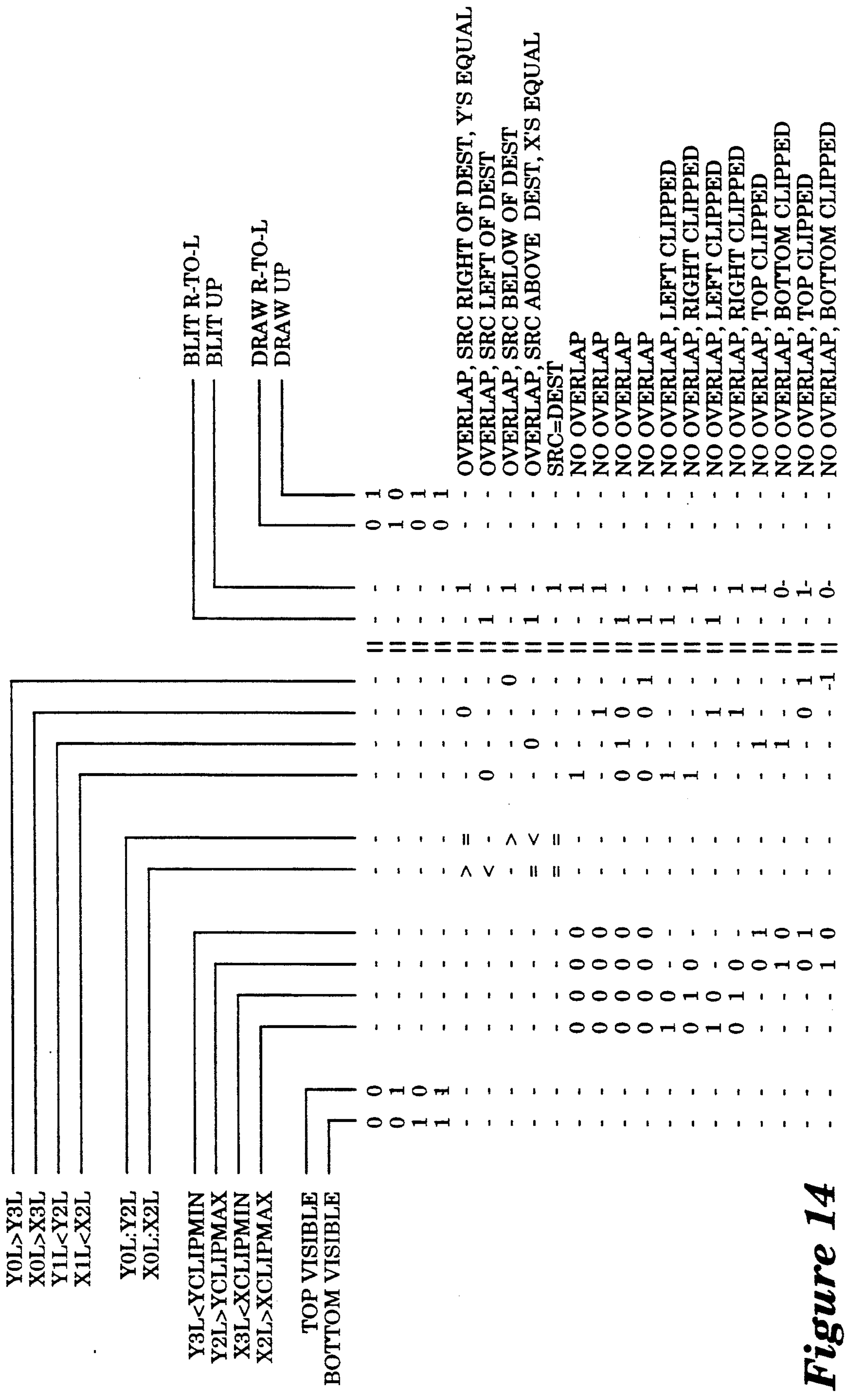
FIG. 14 defines a truth table showing the direction in which to draw objects or perform blits.

FIG. 14 defines a truth table showing the direction in which to draw objects or perform BLITs in order to minimize page crossings and processing of clipped pixels by generating the signals blit r-to-1, blit up, draw r-to-1 and draw up. These signals comprise the signal Drawing Direction shown in FIG. 2. Further details regarding this aspect of the invention may be found in copending application Ser. No. 07/297,604 filed Jan. 13, 1989, now U.S. Pat. No. 5,079,545 issued Jan. 7, 1992.

Based upon the truth tables of FIGS. 10-14, status generation logic 51 generates the signals HW, SW, HID and VIS shown in FIG. 2 as follows:

```
For quadrilateral objects-
HW = hidden OR
    surround clip OR
        (NOT hidden AND
            NOT illegal AND
            all vertices and inside 2^14 AND
        (all vertices are inside test OR
            (line AND at least one endpoint is inside
            test) OR
            (X0-X3 are inside test AND the top or bottom
            vertex is
                inside test) OR
            rect).
SW = NOT HW.
HID = hidden
VIS = NOT hidden
For BLITs-
HW = hid_23 OR
    (hid_01 AND BLIT SRC_CHK = 10) OR
    (NOT hid_01 AND
        BLIT SRC_CHK = 10 AND
        NOT hid_23 AND
        the source rectangle is inside 2^14 AND
        the destination rectangle
            is inside 2^14) OR
    (BLIT_SRC_CHK = 01 AND
        NOT hid_23 AND
        the source rectangle is inside 2^14 AND
        the destination rectangle is inside 2^14)
```

where BLIT_SRC_CHK is a two bit value from the CPU which is set to '10' when it is desired to consider the relationship of the source rectangle to the clipping window. This is necessary because the various graphics software which may utilize the present invention are inconsistent as to their treatment of the SRC rectangle and the clipping boundaries. For this reason, the preferred embodiment has left BLIT SRC rectangle clip checking as a software selectable option (BLIT-SRT-CHK=01 disables SRC clip check, BLIT-SRC-CHK=10 enables SRC clip check).

SW=NOT HW.

HID=hid_23

VIS=NOT hid_23

The preferred embodiment of the current invention has utilized a 2 clock cycle coordinate load stage followed by a 2 clock cycle comparison stage. Whereas these two stages can be overlapped as described, the overall latency is 3 clock cycles, with new input receivable (or new results available) every other clock cycle (i.e. 2 clock cycle throughput). The examples have also shown coordinate staging logic 15 receiving data at the fastest possible rate given this preferred embodiment. It should be appreciated, however, to someone skilled in the art that the circuitry described will handle any slower (less frequent) rate of data arrival. It should also be evident that at the expense of additional logic, a shorter overall latency and a shorter throughput are possible as simple extensions of the present invention.

We claim:

1. An apparatus for converting pairs of original X and Y coordinates of an object to be displayed by a graphics subsystem to pairs of window coordinates for display within an active window, said window coordinates having a predetermined X offset and a predetermined Y offset from said original X and Y coordinates, said conversation being an addition of said original X and Y coordinates to said predetermined X offset and said predetermined Y offset, respectively, said object being one of a quadrilateral to be drawn and a block image to be moved, said apparatus comprising:

a) a pair of raster offset registers for storing said predetermined X offset and sad predetermined Y offset;

b) a plurality of object coordinate registers for storing the sum of respective pairs of said X and Y object coordinates and said predetermined X offset and Y offset;

c) loading control means coupled to an indexing register for controlling the loading of said pair of offset registers with said predetermined X offset and said predetermined Y offset and said plurality of object coordinate registers with said sum;

d) input means coupled to said loading control means, said object coordinate registers and said raster offset registers for receiving from a source external to said apparatus, said X and Y object coordinates and said predetermined X and Y raster offsets, and for storing said predetermined X offset and said predetermined Y offset in said raster offset register and for adding said predetermined X offset and said predetermined Y offset in said raster offset registers to said X and Y object coordinates in said object coordinate registers;

said graphics subsystem for displaying said object which is represented by said sums stored in said object coordinate registers.

2. The apparatus defined by claim 1 wherein said input means comprises a multiplexor means coupled to said pair of raster offset registers, said plurality of object coordinate registers and said loading control means, and an adder means coupled to said source and said multiplexor means for adding said received object coordinates to said predetermined raster offsets in said X and Y raster offset registers and storing the results in said object coordinate registers, wherein said input means and said adder means are controlled by operation of said loading control means and said indexing register.

3. The apparatus defined in claim 1 wherein loading control means comprises a state machine which generates control signals which control the operation of said input means and increment said index register modulo the number of vertices of said object or block image to be moved.

4. The apparatus defined in claim 3 wherein the number of said vertices is four.

* * * * *

UNITED STATES PATENT AND TRADEMARK OFFICE
CERTIFICATE OF CORRECTION

PATENT NO. : 5,274,755

DATED : December 28, 1993

INVENTOR(S) : Priem et al.

It is certified that error appears in the above-identified patent and that said Letters Patent is hereby corrected as shown below:

In column 22, claim 4 line 21, please delete " in " and insert -- by --.

Signed and Sealed this

Twenty-seventh Day of January, 1998

Attest:

BRUCE LEHMAN

*Attesting Officer* *Commissioner of Patents and Trademarks*